(12) United States Patent
Dejima et al.

(10) Patent No.: US 12,539,187 B2
(45) Date of Patent: Feb. 3, 2026

(54) ENDOSCOPE MOUTHPIECE, DRAPE ADAPTER, AND ENDOSCOPE MOUTHPIECE DISPOSAL METHOD

(71) Applicant: FUJIFILM Corporation, Tokyo (JP)

(72) Inventors: Takumi Dejima, Kanagawa (JP); Tomohiro Ohki, Kanagawa (JP); Nobuyuki Torisawa, Kanagawa (JP); Ryo Ishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 541 days.

(21) Appl. No.: 18/051,127

(22) Filed: Oct. 31, 2022

(65) Prior Publication Data

US 2023/0082888 A1 Mar. 16, 2023

Related U.S. Application Data

(63) Continuation of application No. PCT/JP2021/017049, filed on Apr. 28, 2021.

(30) Foreign Application Priority Data

May 1, 2020 (JP) ................................ 2020-081472

(51) Int. Cl.
*A61B 46/10* (2016.01)
*A61B 1/00* (2006.01)
*A61B 1/32* (2006.01)

(52) U.S. Cl.
CPC .......... *A61B 46/10* (2016.02); *A61B 1/00103* (2013.01); *A61B 1/32* (2013.01)

(58) Field of Classification Search
CPC ... A61B 1/00142; A61B 1/00154; A61B 1/24; A61B 1/32; A61B 5/682; A61B 46/23;
(Continued)

(56) References Cited

U.S. PATENT DOCUMENTS

| 5,643,174 A | 7/1997 | Yamamoto et al. |
| 2003/0097043 A1 | 5/2003 | Ouchi et al. |

(Continued)

FOREIGN PATENT DOCUMENTS

| CN | 104955381 A | 9/2015 |
| JP | S63-195804 U1 | 12/1988 |

(Continued)

OTHER PUBLICATIONS

An Office Action; "Notice of Reasons for Refusal," mailed by the Japanese Patent Office on Sep. 26, 2023, which corresponds to Japanese Patent Application No. 2022-518130 and is related to U.S. Appl. No. 18/051,127; with English language translation.

(Continued)

*Primary Examiner* — Aaron B Fairchild
(74) *Attorney, Agent, or Firm* — Studebaker Brackett PLLC

(57) ABSTRACT

An endoscope mouthpiece includes a mouthpiece body, a drape, and a fluid suppression member. The mouthpiece body has a pipe line and has an opening portion provided at an end of the pipe line on a side located outside a body of a patient. The drape is provided integrally with the mouthpiece body and covers a head of the patient. The fluid suppression member is provided in the opening portion to suppress passage of a fluid.

14 Claims, 22 Drawing Sheets

(58) Field of Classification Search
CPC .............. A61B 90/16; A61M 16/0493; A61M 16/0497
See application file for complete search history.

(56) References Cited

U.S. PATENT DOCUMENTS

| | | | |
|---|---|---|---|
| 2015/0265792 | A1 | 9/2015 | Goudra et al. |
| 2018/0221611 | A1* | 8/2018 | Gilhuly ............. A61M 16/0493 |
| 2021/0299383 | A1* | 9/2021 | Molnar ................. A61B 90/05 |

FOREIGN PATENT DOCUMENTS

| JP | H07-163516 | A | | 6/1995 | |
|---|---|---|---|---|---|
| JP | 2000-325302 | A | | 11/2000 | |
| JP | 2000325302 | | * | 11/2000 | .............. A61B 1/00 |
| JP | 2006-051091 | A | | 2/2006 | |
| JP | 2009-057657 | A | | 3/2009 | |
| JP | 2009-254631 | A | | 11/2009 | |
| JP | 2009-254676 | A | | 11/2009 | |
| JP | 2009254676 | | * | 11/2009 | .............. A61B 1/00 |
| JP | 2018-191907 | A | | 12/2018 | |
| KR | 1998-0027828 | U | | 8/1998 | |
| KR | 20-2020-0000651 | U | | 3/2020 | |

OTHER PUBLICATIONS

International Search Report issued in PCT/JP2021/017049; mailed Jul. 6, 2021.
International Preliminary Report On Patentability (Chapter I) and Written Opinion of the International Searching Authority issued in PCT/JP2021/017049; issued Oct. 27, 2022.
An Office Action mailed by China National Intellectual Property Administration on Jul. 9, 2025, which corresponds to Chinese Patent Application No. 202180032488.4 and is related to U.S. Appl. No. 18/051,127; with English language translation.
An Office Action mailed by China National Intellectual Property Administration on Oct. 23, 2025, which corresponds to Chinese Patent Application No. 202180032488.4 and is related to U.S. Appl. No. 18/051,127; with English language translation.

* cited by examiner

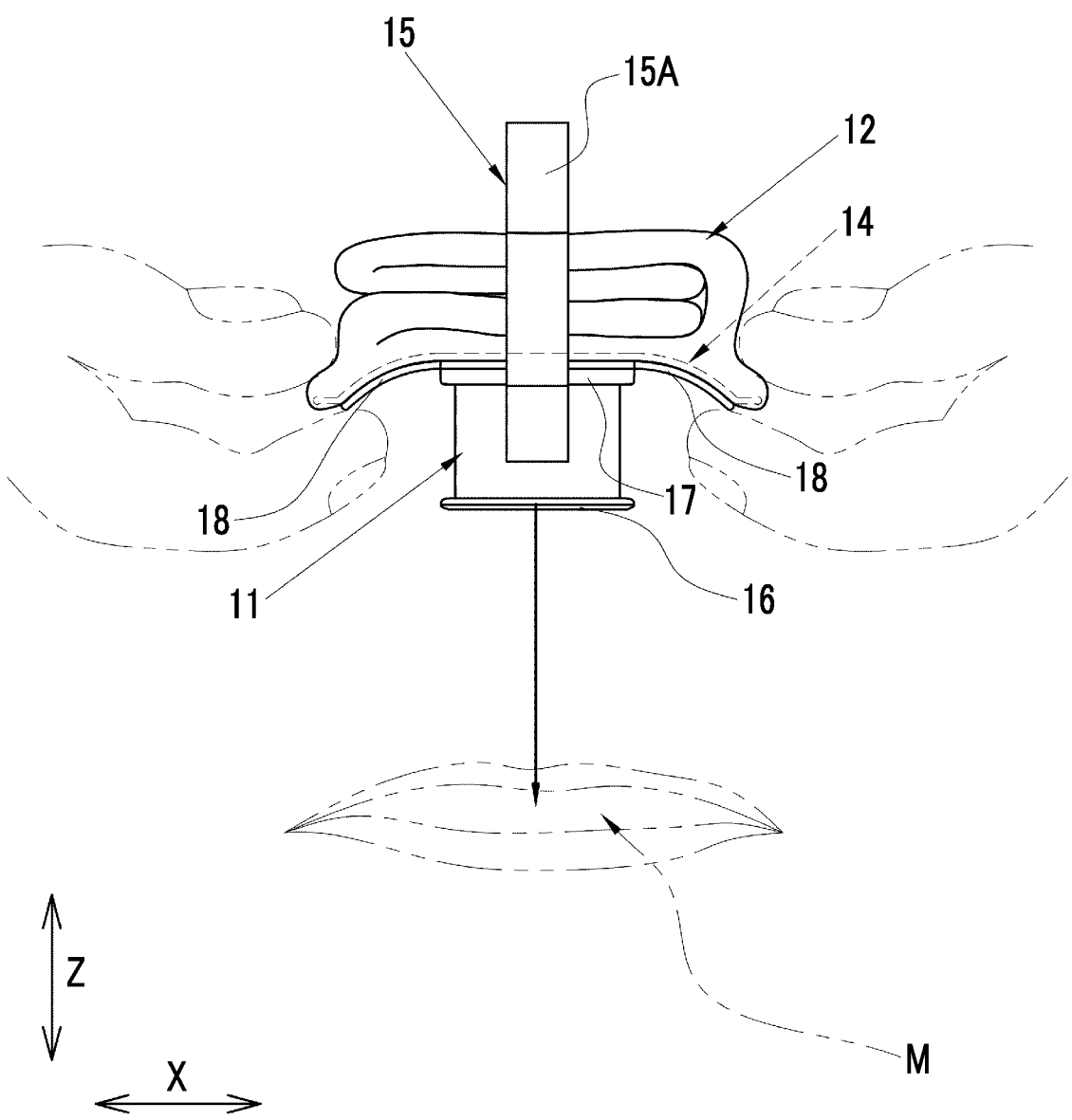

ENDOSCOPE MOUTHPIECE, DRAPE ADAPTER, AND ENDOSCOPE MOUTHPIECE DISPOSAL METHOD

CROSS-REFERENCE TO RELATED APPLICATIONS

This application is a Continuation of PCT International Application No. PCT/JP2021/017049 filed on 28 Apr. 2021, which claims priority under 35 U.S.C § 119(a) to Japanese Patent Application No. 2020-081472 filed on 1 May 2020. The above application is hereby expressly incorporated by reference, in its entirety, into the present application.

BACKGROUND OF THE INVENTION

1. Field of the Invention

The present invention relates to an endoscope mouthpiece and a drape adapter used by being worn on a mouth of a patient in a case where an insertion part of an endoscope is orally inserted, and an endoscope mouthpiece disposal method.

2. Description of the Related Art

In the medical field, oral type endoscopes in which an insertion part is inserted through a mouth are well-known. In a case where the insertion part of the endoscope is inserted through the mouth, an endoscope mouthpiece is used. The endoscope mouthpiece has a pipe line that allows the insertion part of the endoscope to be inserted therethrough. The endoscope mouthpiece is worn on the mouth of the patient by inserting a part thereof into an oral cavity of the patient who is a subject and by the patient holding the inserted portion by the mouth.

As the patient holds a part of the endoscope mouthpiece by the mouth, it is possible to easily introduce the endoscope insertion part into a body through the pipe line, and it is possible to prevent the insertion part from being damaged by the patient's teeth (see, for example, JP2018-191907A).

SUMMARY OF THE INVENTION

In the medical field, it is desired to take further preventive measures against infectious diseases. In particular, it is important to take measures to prevent droplet infection caused by inhaling droplets caused by coughing or sneezing of infectious disease patients.

However, in a case where the endoscope mouthpiece as in the above JP2018-191907A is used, the mouth of the patient cannot be closed because the mouth of the patient holds the endoscope mouthpiece. Thus, in a case where the patient coughs or sneezes in a case where the insertion part of the endoscope is inserted through the mouth using the endoscope mouthpiece, there is a possibility that the droplets discharged from the mouth of the patient are inhaled by persons around the patient.

An object of the present invention is to provide an endoscope mouthpiece, a drape adapter, and an endoscope mouthpiece disposal method that can prevent diffusion of droplets discharged from a mouth of a subject in a case where an insertion part of an endoscope is inserted through the mouth.

The present invention comprises a mouthpiece body, a drape, and a fluid suppression member. The mouthpiece body is a mouthpiece body that is held by a mouth of a subject in a case where an insertion part of an endoscope is orally inserted into the subject, has a pipe line through which the insertion part is inserted, and has an opening portion provided at an end of the pipe line on a side located outside a body of the subject in a case where the mouthpiece body is held by the mouth of the subject. The drape protrudes from an outer peripheral edge of the mouthpiece body and is provided integrally with the mouthpiece body to cover at least a part of the subject. The fluid suppression member is provided at the opening portion to suppress passage of a fluid in the pipe line.

It is preferable that the endoscope mouthpiece further comprises a blade portion that is provided integrally with the mouthpiece body, and the drape is located on a side facing the outside of the body with respect to the blade portion.

It is preferable that the fluid suppression member has a first porous member having a first slit parallel to an insertion direction of the insertion part formed therein, and a second porous member having a second slit parallel to the insertion direction of the insertion part and intersecting the first slit formed therein, and is attached to the opening portion.

It is preferable that the fluid suppression member has a first porous member having at least three first slits formed therein, and a second porous member having at least three second slits formed therein, and is attached to the opening portion.

It is preferable that three first slits are formed in the first porous member, and three second slits are formed in the second porous member. More preferably, the first porous member and the second porous member have a rectangular outer shape, one of the first slits is disposed to be perpendicular to one side of the first porous member, one of the second slits is disposed to be perpendicular to one side of the second porous member, and the first porous member and the second porous member are attached to the opening portion in a state in which the second slit is disposed at a position rotated by 180° around a central axis parallel to the insertion direction with respect to the first slit. It is preferable that the fluid suppression member is attached to the opening portion in a state where the first porous member and the second porous member are laminated.

It is preferable that the fluid suppression member has a duckbill valve that maintains airtightness of the pipe line in a state in which the insertion part is not inserted, and a thin plate member that has a through-hole with an inner diameter that matches an outer diameter of the insertion part and that maintains the airtightness of the pipe line in a state in which the insertion part is inserted, and is attached to the opening portion in a state in which the duckbill valve and the thin plate member are laminated.

It is preferable that the drape is formed in a shape of a sheet and is in a folded state when not in use, and a holding member is stuck on the drape in the folded state to hold the drape in the folded state. It is preferable that the holding member is at least one of a pressure-sensitive adhesive tape, a locking member, a constraint member, or a coating member.

It is preferable that the blade portion is one or a plurality of blade portions that extend in a direction intersecting the insertion direction of the insertion part. Alternatively, it is preferable that the blade portion is one or a plurality of blade portions that extend radially around the pipe line.

It is preferable that the blade portion also serves as a handle in a case where the mouthpiece body is held by the mouth of the subject. It is preferable that the mouthpiece body is integrally provided with a band attachment part that attaches an end part of a fixing band wound around a head of the subject.

A drape adapter of the present invention comprises a fluid suppression member and a drape. The fluid suppression member is attached to an endoscope mouthpiece that is held by a mouth of a subject in a case where an insertion part of an endoscope is orally inserted into the subject and has a pipe line through which the insertion part is inserted, and that is attached to an end of the pipe line on a side located outside a body of the subject in a case where the endoscope mouthpiece is held by the mouth of the subject. The drape is provided integrally with the fluid suppression member and covers at least a part of the subject.

It is preferable that the fluid suppression member has a first porous member having a first slit parallel to an insertion direction of the insertion part formed therein, and a second porous member having a second slit parallel to the insertion direction of the insertion part and intersecting the first slit formed therein.

It is preferable that the fluid suppression member has a first porous member having at least three first slits formed therein, and a second porous member having at least three second slits formed therein.

It is preferable that three first slits are formed in the first porous member, and three second slits are formed in the second porous member. More preferably, the first porous member and the second porous member have a rectangular outer shape, one of the first slits is disposed to be perpendicular to one side of the first porous member, one of the second slits is disposed to be perpendicular to one side of the second porous member, and the first porous member and the second porous member are located such that the second slit is disposed at a position rotated by 180° around a central axis parallel to the insertion direction with respect to the first slit.

It is preferable that the fluid suppression member is integrally provided in a state where the first porous member and the second porous member are laminated.

It is preferable that the fluid suppression member has a duckbill valve that maintains airtightness of the pipe line in a state in which the insertion part is not inserted, and a thin plate member that has a through-hole with an inner diameter that matches an outer diameter of the insertion part and that maintains the airtightness of the pipe line in a state in which the insertion part is inserted, and is integrally provided in a state in which the duckbill valve and the thin plate member are laminated.

An endoscope mouthpiece disposal method according to an aspect of the present invention is an endoscope mouthpiece disposal method using an endoscope mouthpiece including a mouthpiece body, and a drape, the disposal method comprising discarding the endoscope mouthpiece by removing the insertion part from a subject and then removing the endoscope mouthpiece from a mouth of the subject together with the drape. The mouthpiece body is held by the mouth of the subject in a case where an insertion part of an endoscope is orally inserted into the subject. The drape is provided integrally with the mouthpiece body and covers at least a part of the subject.

An endoscope mouthpiece disposal method according to an aspect of the present invention is an endoscope mouthpiece disposal method using a mouthpiece body and a drape, the disposal method comprising discarding the endoscope mouthpiece by removing the insertion part from a subject and then removing the endoscope mouthpiece from a mouth of the subject together with the drape. The endoscope mouthpiece is held by the mouth of the subject in a case where an insertion part of an endoscope is orally inserted into the subject. The drape is provided separately from the endoscope mouthpiece and covers at least a part of the subject.

According to the present invention, in a case where the insertion part of the endoscope is inserted through the mouth, it is possible to prevent the diffusion of droplets discharged from the mouth of the subject.

BRIEF DESCRIPTION OF THE DRAWINGS

FIG. 11 is an explanatory view illustrating an operation in a case where the endoscope mouthpiece is mounted on a mouth of a patient.

DESCRIPTION OF THE PREFERRED EMBODIMENTS

First Embodiment

Figure 1:
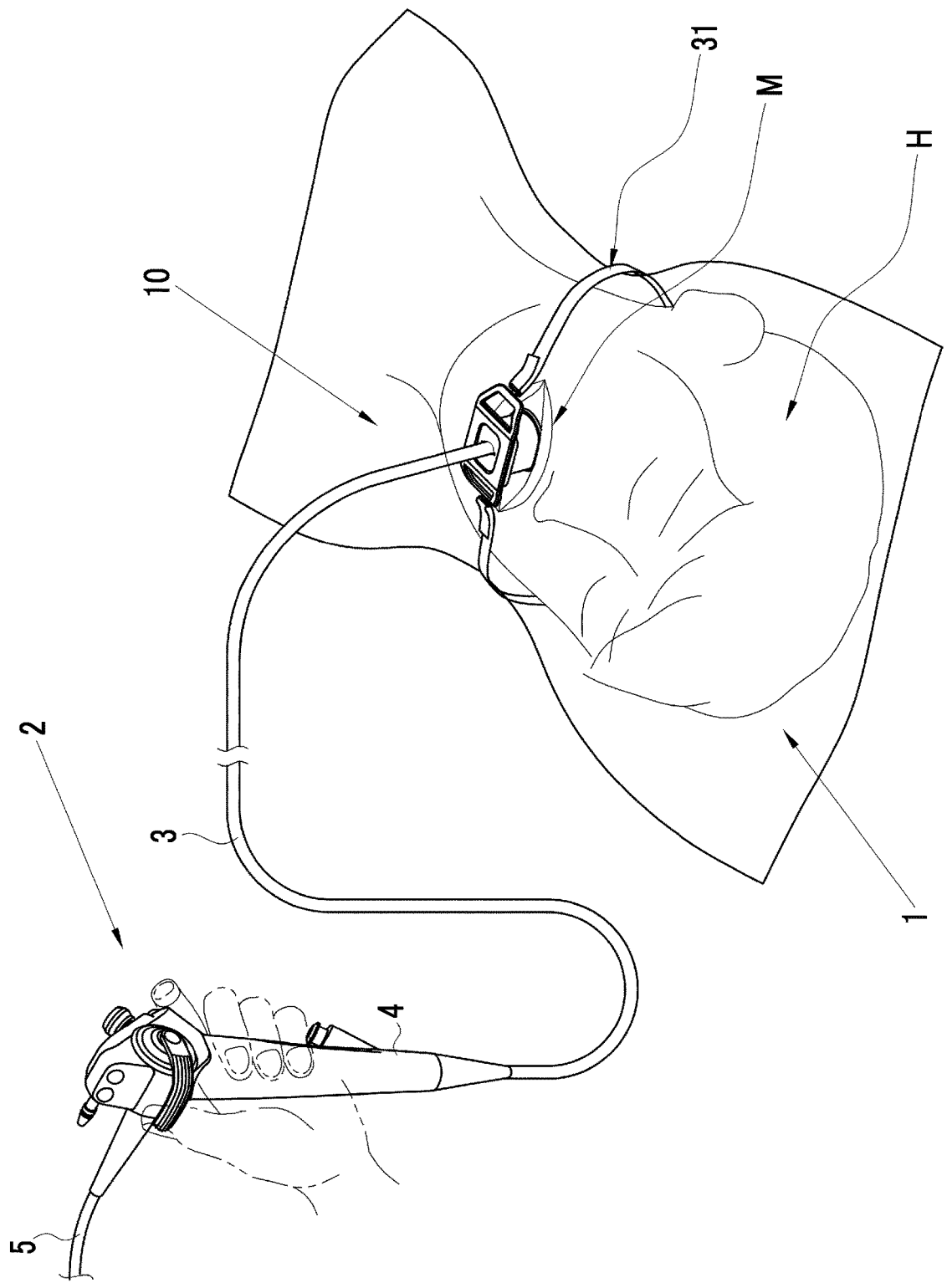
FIG. 1 is a schematic view showing endoscopy using an oral type endoscope.

As shown in FIG. 1, an endoscope mouthpiece 10 of the embodiment of the present invention is used for endoscopy using an oral type endoscope 2. The endoscope 2 is, for example, a bronchoscope to be inserted into a trachea, and comprises an insertion part 3 inserted into the trachea of a patient 1 who is a subject, an operating part 4 consecutively installed at a proximal end part of the insertion part 3, and a universal cord 5 connected to the operating part 4. The universal cord 5 is connected to an external device such as a processor device or a light source device via a connector (not shown).

Although not shown, a distal end surface of the insertion part 3 is provided with an observation window and an illumination window. An image sensor (not shown) is disposed behind the observation window, and an optical fiber cable (not shown) is disposed behind the illumination window. A signal line of the image sensor and the optical fiber cable are connected to a processor device and a light source device, respectively, through the insertion part 3, the operating part 4, and the universal cord 5. The processor device performs image processing or the like on an endoscopic image captured by the image sensor and displays the image-processed image on a monitor.

In a case where the insertion part 3 of the endoscope 2 is inserted through a mouth M of the patient 1, the endoscope mouthpiece 10 is worn on the mouth of the patient 1.

Figure 2:
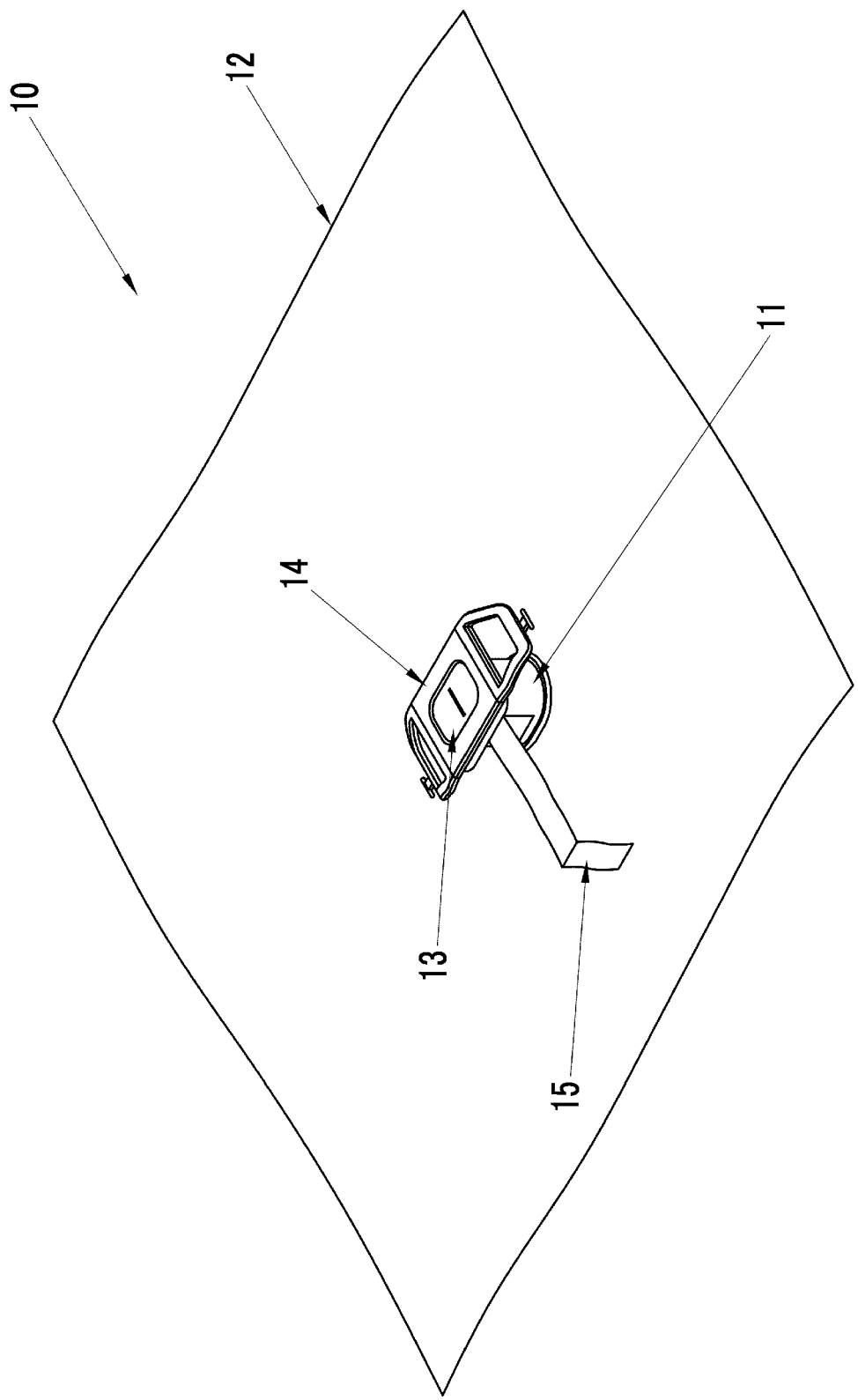
FIG. 2 is a perspective view of an endoscope mouthpiece.

As shown in FIG. 2, the endoscope mouthpiece 10 includes a mouthpiece body 11, a drape 12, a fluid suppression member 13, a retaining member 14, and a pressure-sensitive adhesive tape 15. The drape 12 has a small thickness and is formed in the shape of a quadrangular sheet, for example, is formed of a transparent vinyl sheet. The drape 12 has an area that covers and hides at least a part of the subject, for example, a head H of the patient 1 (see FIG. 1).

Figure 3:
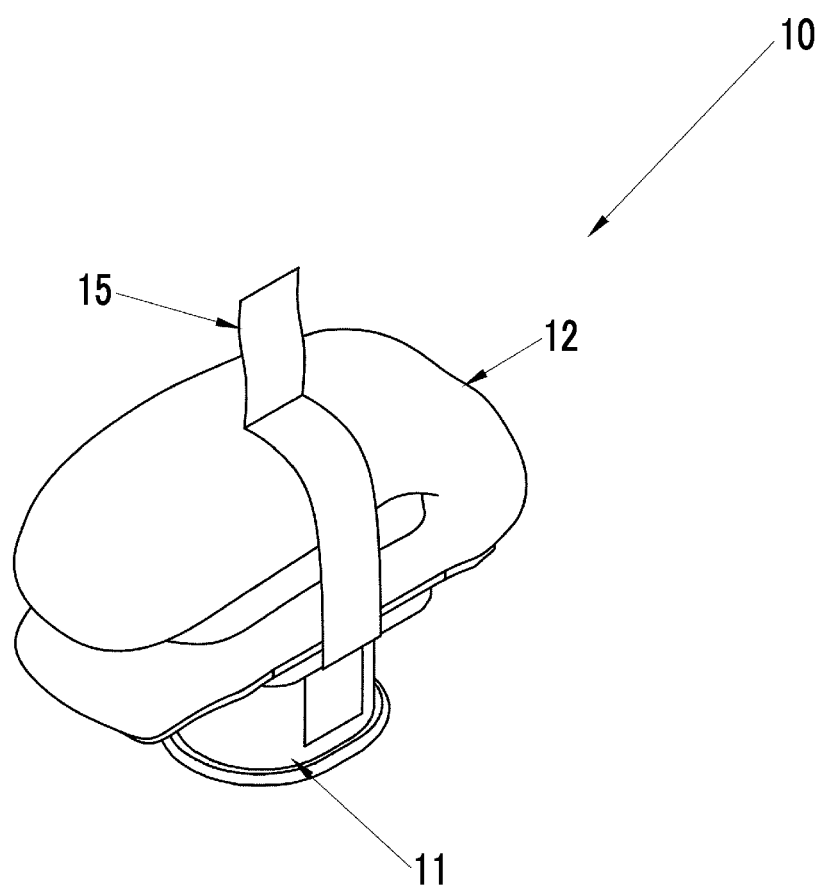
FIG. 3 is a perspective view of the endoscope mouthpiece in an unused state.

As shown in FIG. 3, the drape 12 is in a folded state when not in use and has the pressure-sensitive adhesive tape 15 as a holding member stuck on an end part thereof. By applying the pressure-sensitive adhesive tape 15, the drape 12 is held in the folded state. In addition, the method of folding the drape 12 and the method of applying the pressure-sensitive adhesive tape 15 will be described below.

Figure 4:
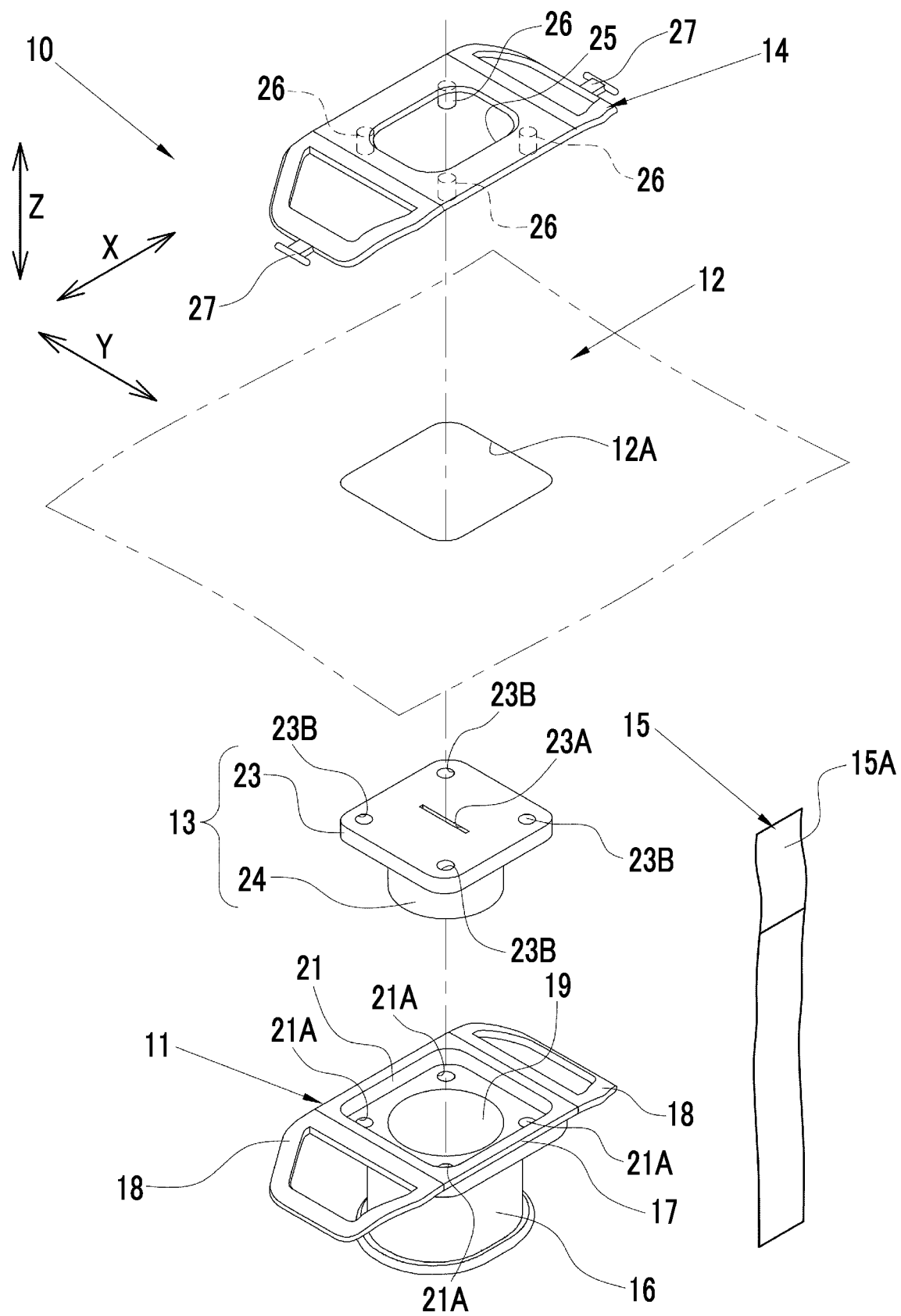
FIG. 4 is an exploded perspective view showing a configuration of the endoscope mouthpiece.
Figure 5:
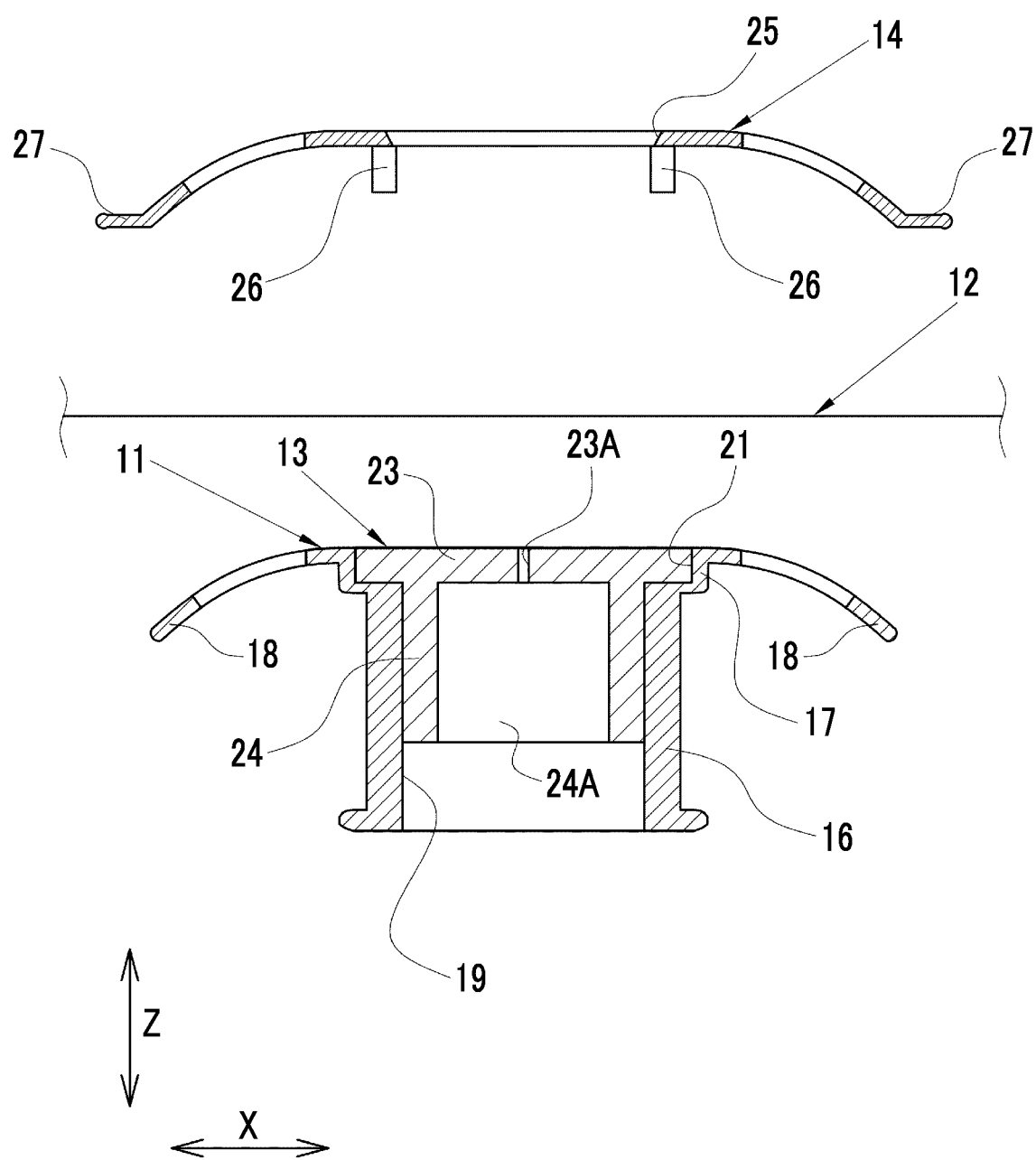
FIG. 5 is a cross-sectional view showing a configuration of the endoscope mouthpiece.

As shown in FIGS. 4 and 5, the mouthpiece body 11 is integrally provided with a tubular portion 16, a frame portion 17, and a pair of blade portions 18. The mouthpiece body 11 is formed of, for example, a soft material such as a soft resin to be easily mounted on the mouth M of the patient 1. The tubular portion 16 is a portion that is held by the mouth M of the patient 1 in a case where the insertion part 3 of the endoscope 2 is orally inserted into the patient 1. The tubular portion 16 is formed in, for example, an elliptical cross-sectional shape to be easily held by the mouth M. The endoscope mouthpiece 10 is worn in a direction in which an outer diameter of the tubular portion 16 is large and in a direction in which an inner diameter of the mouth M is large, that is, parallel to a left-right direction X of the patient 1. Hereinafter, the left-right direction X of the patient 1 in a case where the tubular portion 16 is held by the mouth M will be described as the left-right direction X in the endoscope mouthpiece 10. Additionally, an insertion direction Z, which will be described below, is a direction parallel to an axial direction of the pipe line 19 and perpendicular to the left-right direction X, and a front-back direction Y is a direction perpendicular to the left-right direction X and to the insertion direction Z.

The frame portion 17 is consecutively installed at the tubular portion 16 and is formed in a quadrangular frame shape. The frame portion 17 is located outside a body of the patient 1 in a case where the tubular portion 16 is held by the mouth M. Inside the tubular portion 16 and the frame portion 17, there is the pipe line 19 through which the insertion part 3 is inserted. The pipe line 19 is a through-hole having a circular or elliptical cross section.

The pipe line 19 has an opening portion 21 provided at an end on a side located outside the body of the patient 1 in a case where the tubular portion 16 is held by the mouth M. The opening portion 21 is a rectangular opening portion that matches the frame portion 17. Fitting holes 21A into which fitting pins 26, which will be described below, are fitted are formed at the four corners of the opening portion 21. The opening portion 21 is provided with the fluid suppression member 13. In a case where the tubular portion 16 is held by the mouth M, the fluid suppression member 13 suppresses passage of a fluid in the pipe line 19 leading to the inside of the body of the patient 1. Specifically, the fluid suppression member 13 allows gas such as air necessary for breathing to pass through and blocks liquid such as droplets.

The pair of blade portions 18 is formed in a trapezoidal shape that extends in a direction intersecting the insertion direction Z, specifically, extends in the left-right direction X from both left and right end parts of the frame portion 17, and gradually decreases in width toward a distal end part from a position in contact with the frame portion 17. The pair of blade portions 18 has a curved shape curved in a direction close to the head H of the patient 1 in a case where the tubular portion 16 is held by the mouth M. Additionally, the pair of blade portions 18 also serves as a handle in a case where the mouthpiece body 11 is held by the mouth M of the patient 1, as will be described below.

Figure 6A:
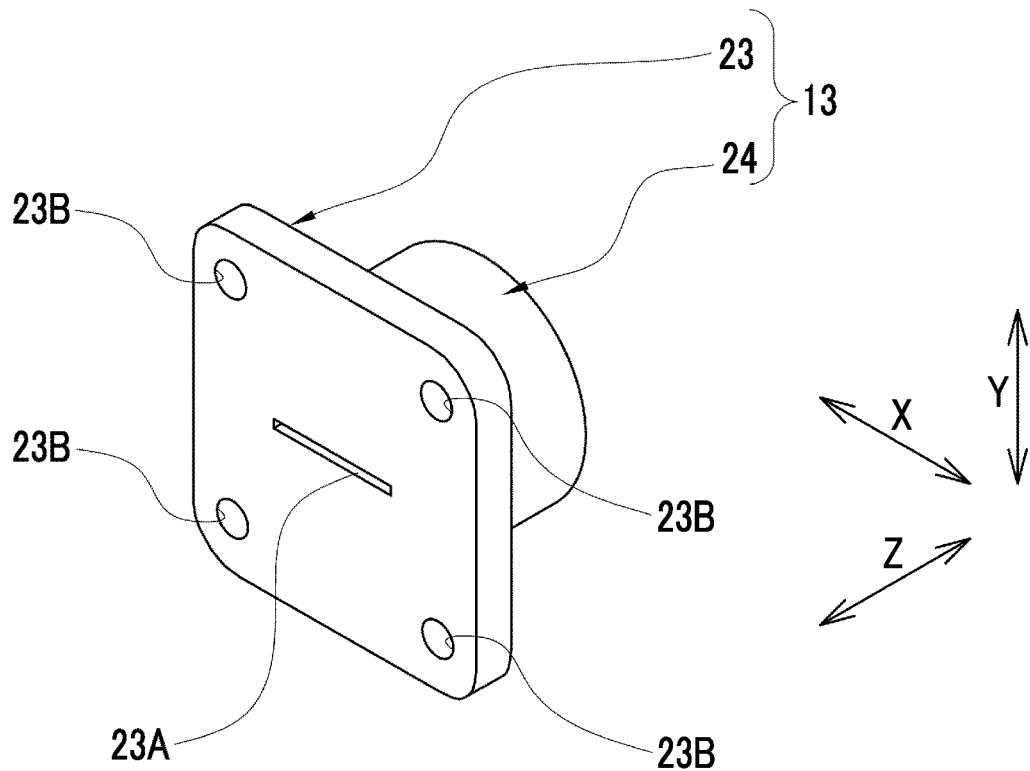
FIGS. 6A and 6B are perspective views showing a configuration of a close contact member.

As shown in FIG. 6A, the fluid suppression member 13 has a first porous member 23 and a second porous member 24. The first porous member 23 is formed by forming a flexible porous material into a rectangular plate shape. The first porous member 23 has a first slit 23A. The first porous member 23 is formed with a size such that the first porous member is housed in the opening portion 21. The first slit 23A is formed parallel to the left-right direction X and parallel to the insertion direction Z of the insertion part 3. Additionally, in the first porous member 23, fitting holes 23B are formed at positions near the four corners and at positions where the first porous member 23 does not interfere with the first slit 23A. The fitting holes 23B are disposed at positions corresponding to the fitting holes 21A of the mouthpiece body 11.

Figure 6B:
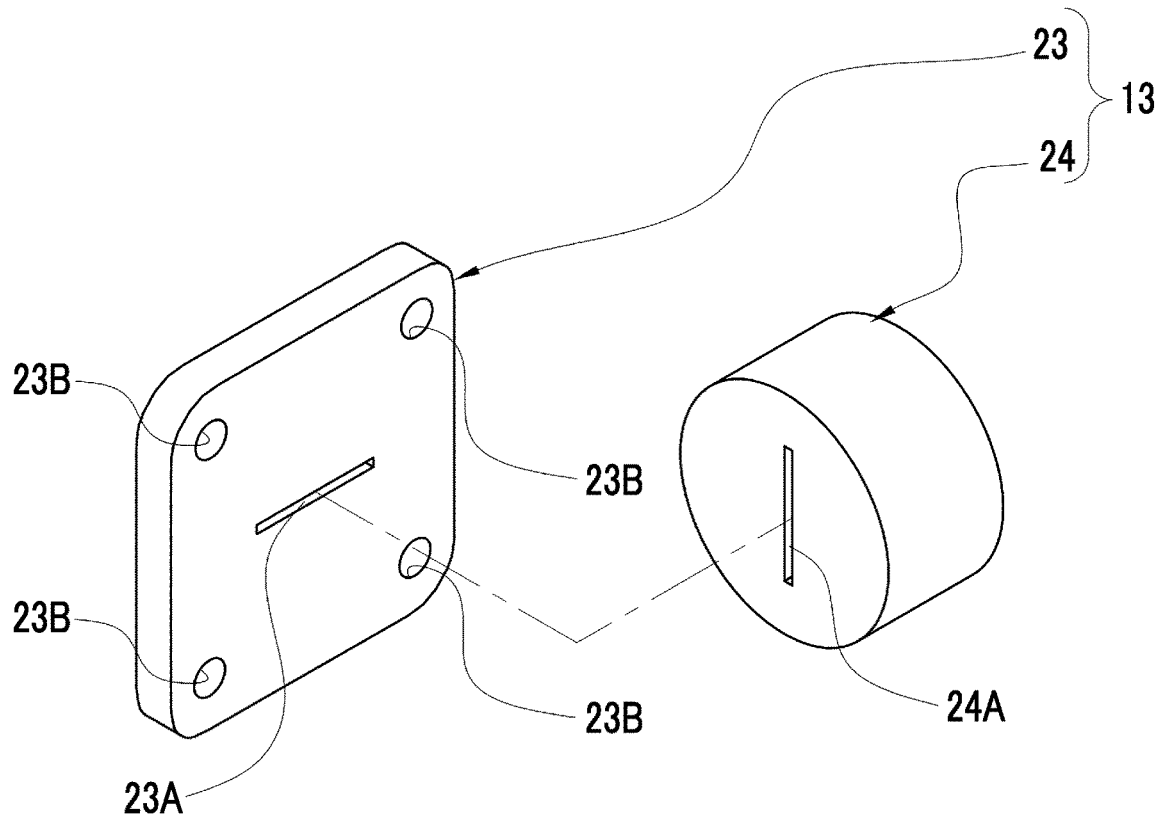

As shown in FIG. 6B, the second porous member 24 is formed by forming a flexible porous material into a disk shape. The second porous member 24 has a second slit 24A. The second porous member 24 is formed with such a size that the second porous member 24 is housed in the pipe line 19. The second slit 24A is formed in a direction parallel to the insertion direction Z and intersecting the first slit 23A. More specifically, the second slit 24A is formed parallel to the insertion direction Z and parallel to the front-back direction Y.

The porous material that forms the first porous member 23 and the second porous member 24 is a porous material having a pore diameter and a structure that allows gas such as air necessary for breathing to pass therethrough and that blocks liquids such as droplets. For example, a synthetic sponge obtained by foam-molding a resin or a natural sponge such as a sponge is used. The first porous member 23 and the second porous member 24 may be formed separately, and the first slit 23A and the second slit 24A may be made to adhere to each other and be integrated with each other in an intersecting state.

Figure 7:
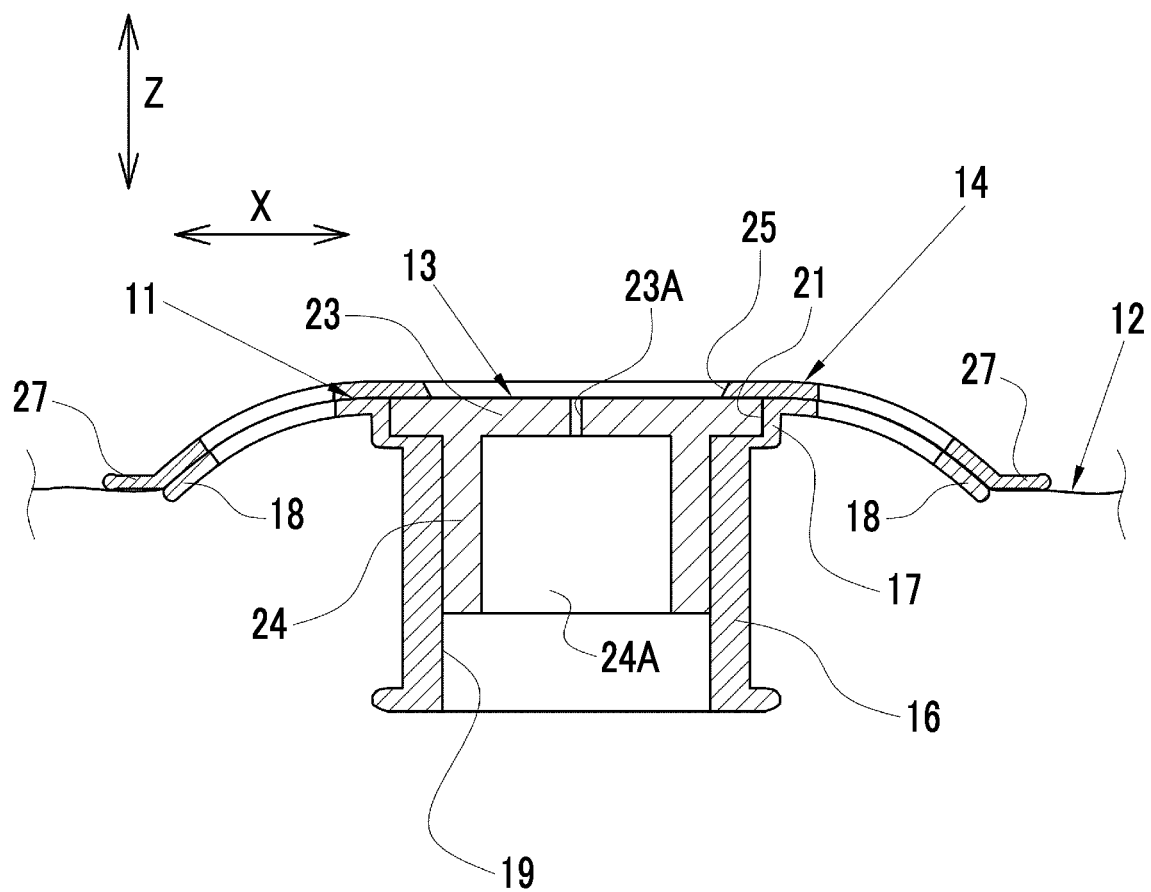
FIG. 7 is a cross-sectional view of major parts of the endoscope mouthpiece.

As shown in FIG. 7, in the fluid suppression member 13, the first porous member 23 is housed in the opening portion 21, the second porous member 24 is housed in the pipe line 19, and the positions thereof in the insertion direction Z are restricted by the retaining member 14. Accordingly, the first porous member 23 and the second porous member 24 are attached to the opening portion 21 in a laminated state.

Figure 8:
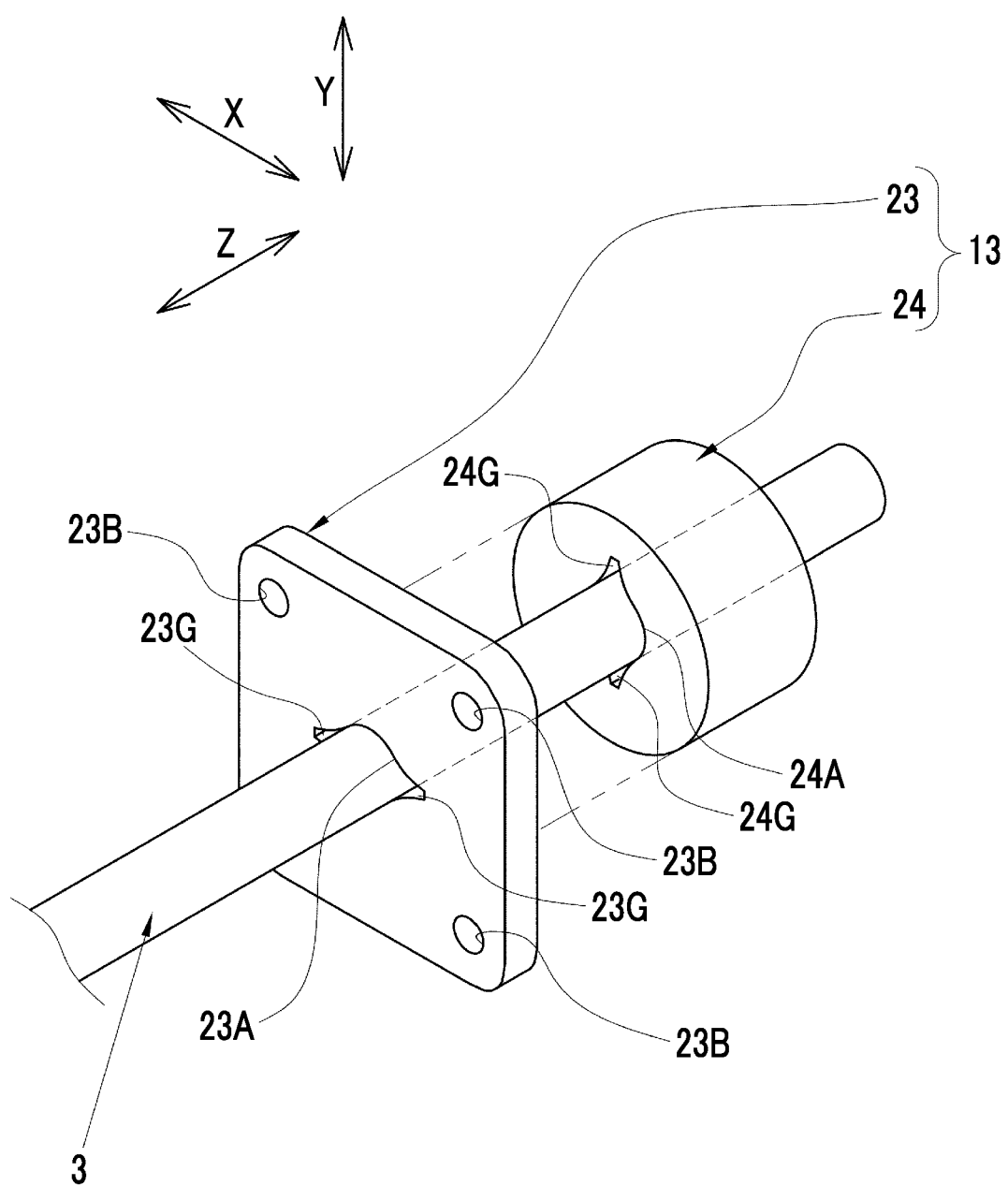
FIG. 8 is an explanatory view illustrating a state in which an insertion part is inserted into the close contact member.

As shown in FIG. 8, in a case where the insertion part 3 is inserted into the pipe line 19 through the fluid suppression member 13, the insertion part 3 moves in the insertion direction Z while an outer peripheral surface of the insertion part 3 comes into close contact with the first slit 23A and the second slit 24A. In this case, gaps 23G and 24G are formed at both end parts of the first slit 23A and the second slit 24A. However, since the first slit 23A and the second slit 24A intersect each other as described above, the positions of the gaps 23G and 24G do not overlap each other.

The retaining member 14 is formed in a thin plate shape. The outer shape of the retaining member 14 is a shape that matches the frame portion 17 and the pair of blade portions 18. The retaining member 14 is formed of, for example, a soft material such as a soft resin.

The retaining member 14 is formed with an opening portion 25, four fitting pins 26 (see FIG. 5), and a band attachment part 27. The opening portion 25 is disposed at a position facing the opening portion 21 of the mouthpiece body 11. Each fitting pin 26 protrudes from a position around the opening portion 25 and facing the opening portion 21. The fitting pin 26 fits into the fitting hole 21A of the mouthpiece body 11. Accordingly, the mouthpiece body 11 and the retaining member 14 are combined with each other. The band attachment part 27 is integrally provided at both end parts of the retaining member 14, and has an end part of the fixing band 31 wound around the head H of the patient 1 attached thereto. The band attachment part 27 is formed in a T shape.

As shown in FIG. 4, the drape 12 is formed with an opening portion 12A that matches the outer shape of the fluid suppression member 13. Accordingly, since the drape 12 does not block the fluid suppression member 13, the insertion part 3 can be inserted into the pipe line 19 through the fluid suppression member 13. In addition, for convenience of illustration, the drape 12 in FIG. 4 is shown by cutting out only the periphery of the opening portion 12A (a range surrounded by a two-dot chain line), and the actual size thereof is larger than the range surrounded by the two-dot chain line.

As shown in FIG. 7, the retaining member 14 sandwiches the drape 12 with the mouthpiece body 11 in a state in which the fluid suppression member 13 is housed in the opening portion 21 and the pipe line 19. In this case, by fitting the fitting pin 26 of the retaining member 14 into the fitting hole 23B of the fluid suppression member 13 and the fitting hole 21A of the mouthpiece body 11, the retaining member 14 can be anchored to the mouthpiece body 11, and the fluid suppression member 13 can be attached to the opening portion 21. Since the position of the fluid suppression member 13 is restricted by the retaining member 14 in the insertion direction Z, the fluid suppression member 13 does not separate from the opening portion 21. Additionally, by anchoring the retaining member 14 to the mouthpiece body 11, the band attachment part 27 is integrated with the mouthpiece body 11.

As described above, the drape 12 is sandwiched and fixed between the mouthpiece body 11 and the retaining member 14. Accordingly, in a case where the tubular portion 16 is held by the mouth M, the drape 12 is located on the side facing the outside of the body of the patient 1 with respect to the pair of blade portions 18. Even in a case where the drape 12 covers and hides the head H of the patient 1, a space formed by the pair of blade portions 18 is present between the head H of the patient 1 and the drape 12.

As described above, the drape 12 sandwiched between the mouthpiece body 11 and the retaining member 14 protrudes from an outer peripheral edge of the mouthpiece body 11 and is provided integrally with the mouthpiece body 11 (a state shown in FIG. 2), while the drape 12 is in the folded state when the endoscope mouthpiece 10 is not in use, and the folded state is maintained by the pressure-sensitive adhesive tape 15 (a state shown in FIG. 3). A method of folding the drape 12 and a method of applying the pressure-sensitive adhesive tape 15 will be described below.

Figure 9A:
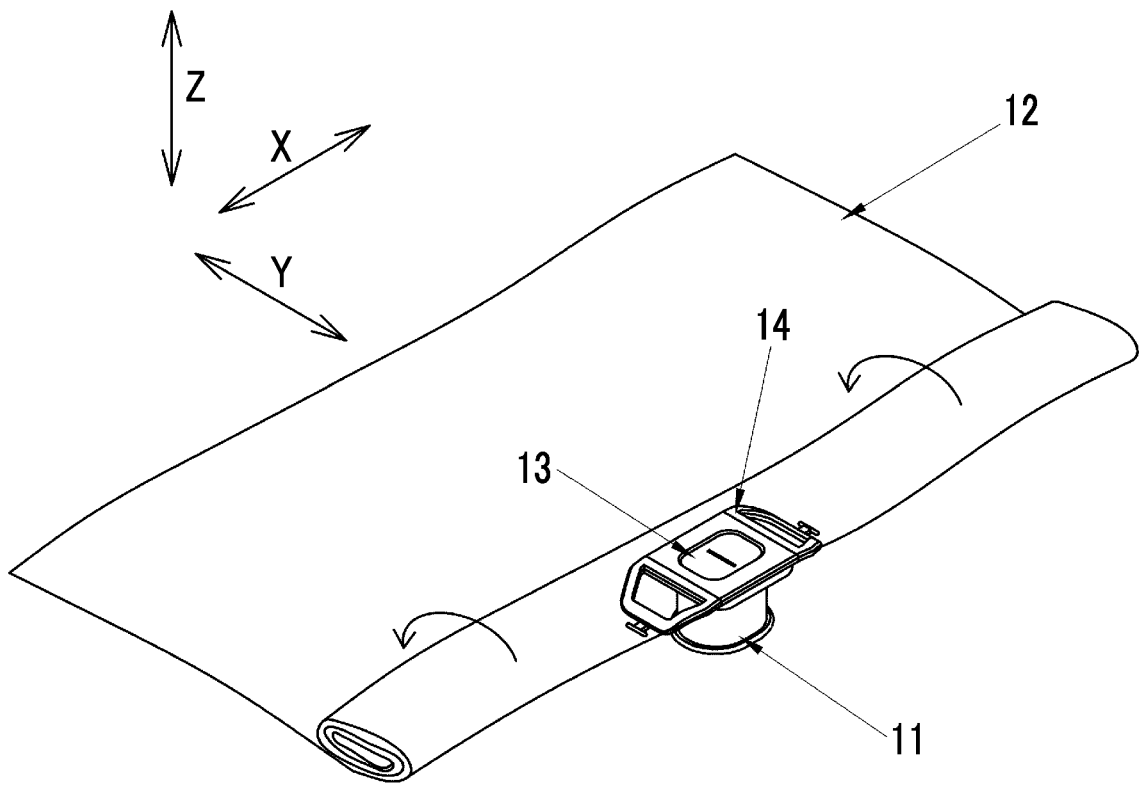
FIGS. 9A and 9B are explanatory views illustrating a method of folding a drape in a front-back direction.
Figure 9B:
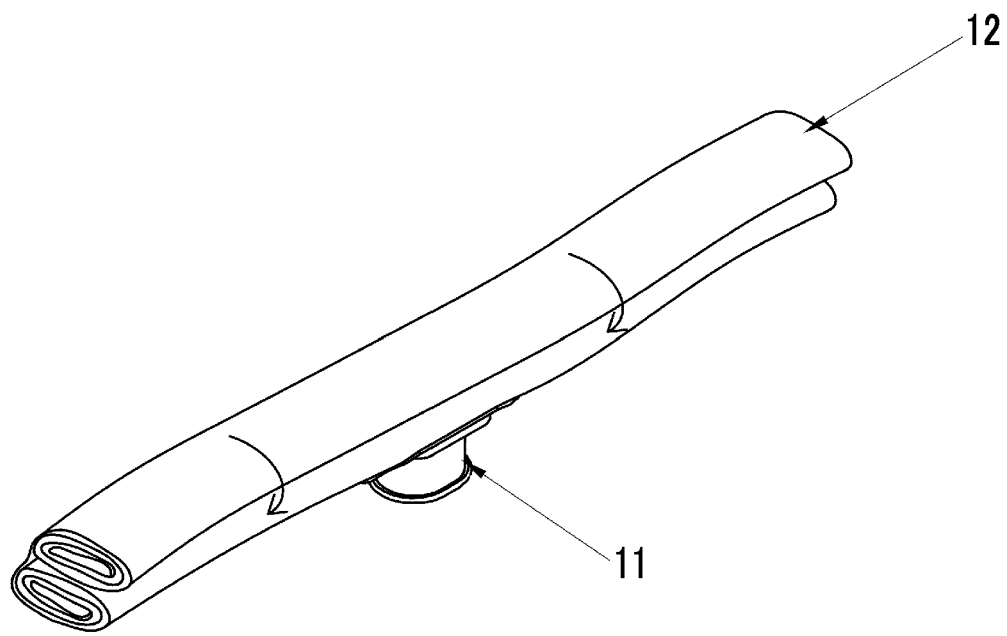

As shown in FIG. 9A, in a case where the drape 12 is folded, for example, the drape 12 is rolled from one end in the front-back direction Y, and the drape 12 is rolled to the position of the mouthpiece body 11 located at the center, and then, the drape 12 is also rolled from the other end in the front-back direction Y. Accordingly, as shown in FIG. 9B, the drape 12 has an elongated belt shape.

Figure 10A:
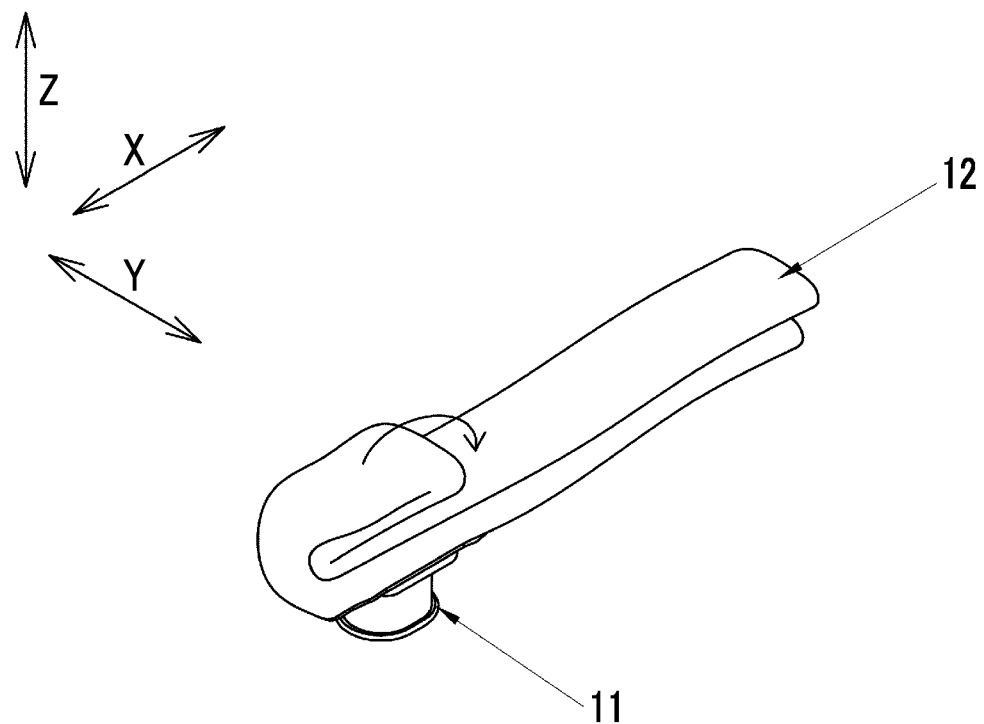
FIGS. 10A and 10B are explanatory views illustrating a method of folding the drape in a longitudinal direction.
Figure 10B:
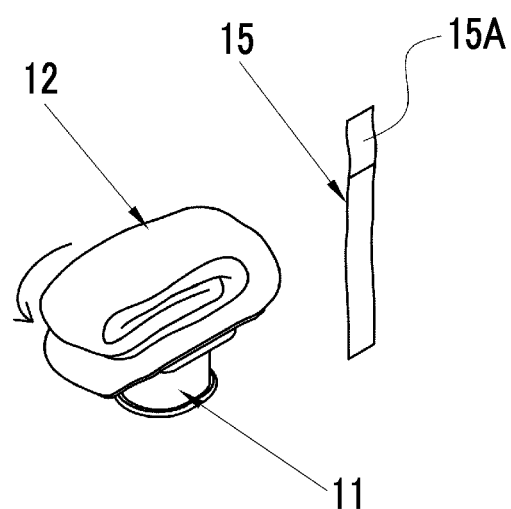

Next, as shown in FIG. 10A, the drape 12 is folded to be rolled from one end having the elongated belt shape. Then, after the drape 12 is rolled to the position of the mouthpiece body 11 located at the center, the drape 12 is also rolled from the other end having the elongated belt shape. Accordingly, as shown in FIG. 10B, the drape 12 is in a small folded state. Then, the pressure-sensitive adhesive tape 15 is stuck on an end part of the drape 12 from the mouthpiece body 11. An end part 15A of the pressure-sensitive adhesive tape 15 does not adhere to the drape 12 but is made to protrude from the outer shape of the drape 12. In this case, for example, the end part 15A is folded back, and the pressure-sensitive adhesive surfaces thereof are stuck to each other in advance to form a portion where the pressure-sensitive adhesive surfaces are not exposed, on the pressure-sensitive adhesive tape 15.

By applying the pressure-sensitive adhesive tape 15 as described above, the folded state of the drape 12 is maintained (the state shown in FIG. 3). Additionally, by making the end part 15A not adhere to the drape 12, in a case where the endoscope mouthpiece 10 is used, it is easy to grip the end part 15A and to peel off the pressure-sensitive adhesive tape 15.

As described above, the pair of blade portions 18 has the curved shape curved in a direction close to the head H of the patient 1 (see FIG. 11). Accordingly, the pair of blade portions 18 can also serve as a handle in a case where the mouthpiece body 11 is held by the mouth M of the patient 1. In addition, in the present embodiment, the retaining member 14 is curved in the same direction as the pair of blade portions 18. For this reason, together with the pair of blade portions 18, the retaining member 14 and the folded drape 12 are gripped by a user as handles.

The operation in a case where a doctor, who is the user, makes the endoscope mouthpiece 10 be worn on the mouth M of the patient 1 and inserts the insertion part 3 through the pipe line 19 will be described. As shown in FIG. 11, first, the doctor grips the pair of blade portions 18 together with the drape 12 and the retaining member 14 and makes the tubular portion 16 be held by the mouth M of the patient 1.

After the endoscope mouthpiece 10 is worn on the mouth M, the doctor peels the pressure-sensitive adhesive tape 15 off from the mouthpiece body 11 and the drape 12. By peeling off the pressure-sensitive adhesive tape 15, the drape 12 can be brought to an original state, that is, a spread state thereof from the folded state. Then, by mounting the endoscope mouthpiece 10 to be worn on the mouth M and bringing the drape 12 into the spread state, the head H of the patient 1 can be covered and hidden with the drape 12.

Figure 12:
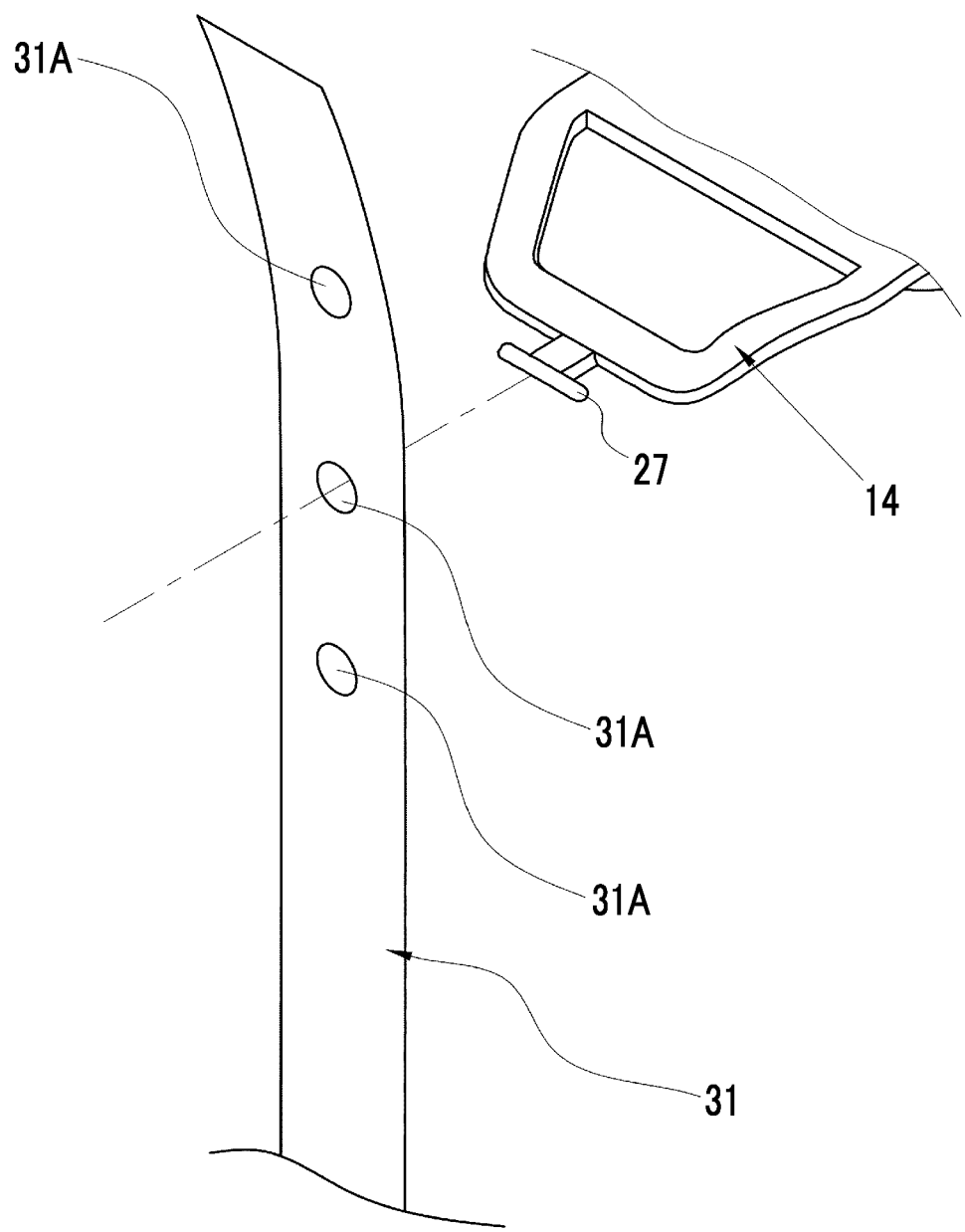
FIG. 12 is an explanatory view illustrating an operation of attaching an end part of a fixing band to a band attachment part.

Next, the doctor attaches an end part of the fixing band 31 to the band attachment part 27. As shown in FIG. 12, a plurality of mounting holes 31A are formed at the end part of the fixing band 31. The fixing band 31 is formed of, for example, a soft material such as rubber, and the end part of the fixing band 31 can be attached to the mounting holes 31A through the band attachment part 27.

Figure 13:
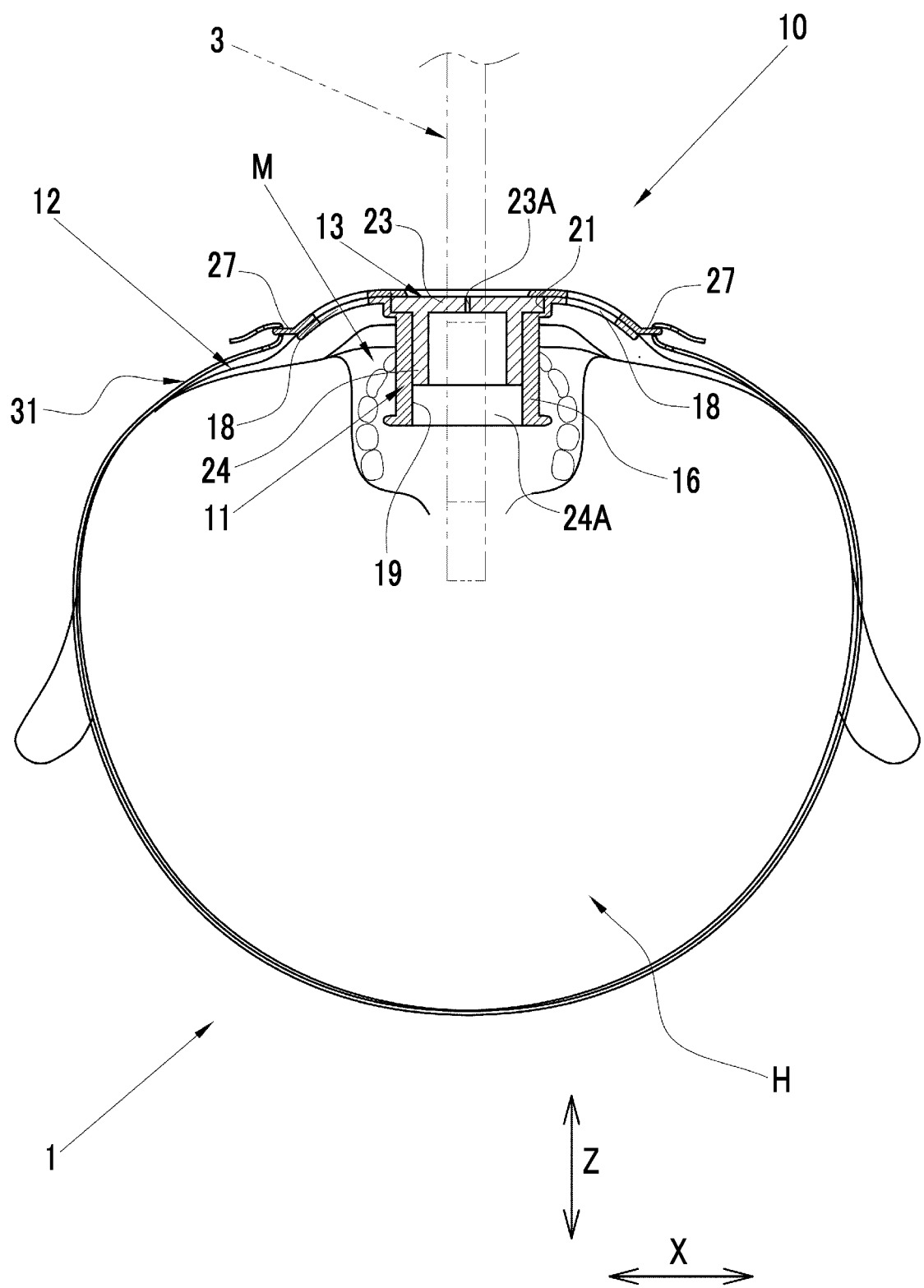
FIG. 13 is an explanatory view showing a state in which the endoscope mouthpiece is worn on the mouth.

As shown in FIG. 13, by attaching both end parts of the fixing band 31 to the band attachment part 27, the fixing band 31 can be wound around the head H of the patient 1 to fix the endoscope mouthpiece 10. Accordingly, the endoscope mouthpiece 10 can be completely mounted on the mouth M. By changing the positions of the mounting holes 31A through which the band attachment part 27 is passed, the length of the fixing band 31 wound around the head H of the patient 1 can be adjusted. Additionally, since the band attachment part 27 is located outside the drape 12, the fixing band 31 is wound around the head H of the patient 1 together with the drape 12.

As described above, after the endoscope mouthpiece 10 is worn on the mouth M and the head H of the patient 1 is covered and hidden with the drape 12, the doctor inserts the insertion part 3 of the endoscope 2 through the pipe line 19 of the endoscope mouthpiece 10 into the body of the patient 1 through the mouth M. Even in a case where the patient 1 coughs or sneezes in a case where the insertion part 3 is inserted through the mouth M, the drape 12 covers and hides the head H of the patient 1. Therefore, diffusion of the droplets discharged from the mouth M of the patient 1 can be prevented by the drape 12. Thus, since inhalation of the droplets discharged from the mouth M of the patient 1 by a person around the patient can be suppressed, droplet infection can be reliably prevented.

Additionally, even in a case where the drape 12 covers and hides the head H of the patient 1, the space formed by the pair of blade portions 18 is present between the head H of the patient 1 and the drape 12. Therefore, the breathing of the patient 1 is not hindered.

Additionally, the insertion part 3 is inserted into the pipe line 19 through the fluid suppression member 13. However, since the first slit 23A and the second slit 24A intersect each other as described above, the positions of the gaps 23G and 24G do not overlap each other. That is, even in a case where the insertion part 3 is inserted through the fluid suppression member 13, or even in a case where the insertion part 3 is not inserted, the passage of the fluid can be suppressed, and the droplets are prevented from leaking from the fluid suppression member 13.

The endoscope mouthpiece 10 is a disposable type in which the insertion part 3 is removed from the mouth of the patient 1, and is then removed from the mouth of the patient 1 together with the drape 12 and discarded. Accordingly, since the endoscope mouthpiece 10 can be removed from the mouth of the patient 1 and then be wrapped in the drape 12 and discarded, the adhering droplets of the patient 1 are not diffused, and the endoscope mouthpiece 10 can be discarded.

In addition, in the above first embodiment, the first porous member 23 and the second porous member 24 constituting the fluid suppression member 13 are attached to the opening portion 21 of the mouthpiece body 11 in the laminated state. However, the present invention is not limited to this, and the first porous member 23 and the second porous member 24 may be integrally formed as the fluid suppression member 13, and the integrally formed fluid suppression member 13 may be attached to the opening portion 21 of the mouthpiece body 11. Additionally, in the above first embodiment, the position of the fluid suppression member 13 with respect to the mouthpiece body 11 is restricted by the retaining member 14. However, the present invention is not limited to this, and the fluid suppression member 13 may be fixed by adhering to the mouthpiece body 11, or the like.

Second Embodiment

Figure 14A:
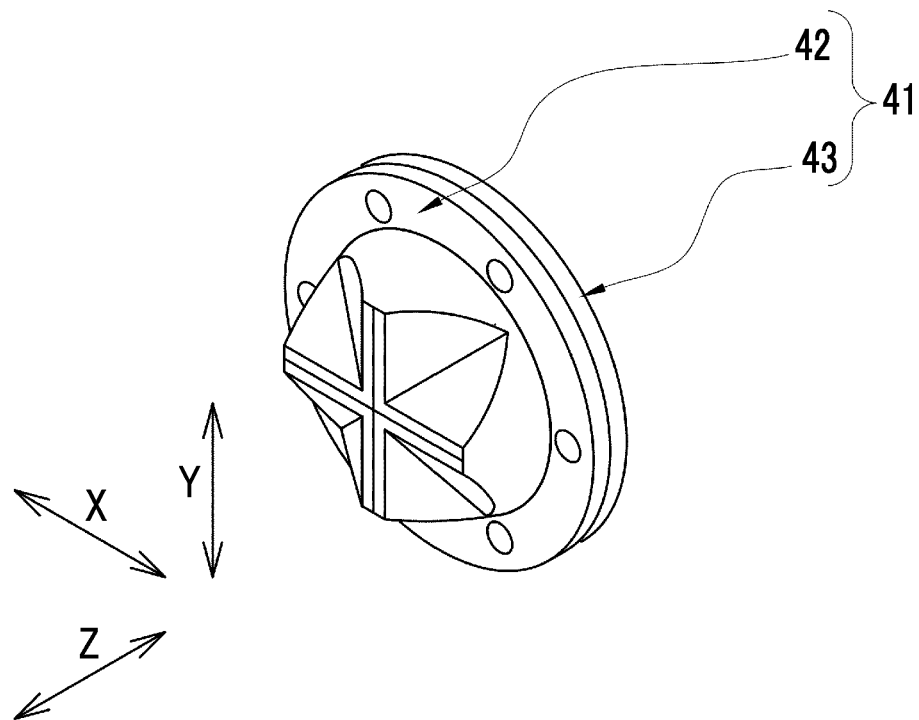
FIGS. 14A and 14B are perspective views showing a configuration of a close contact member according to a second embodiment.
Figure 14B:
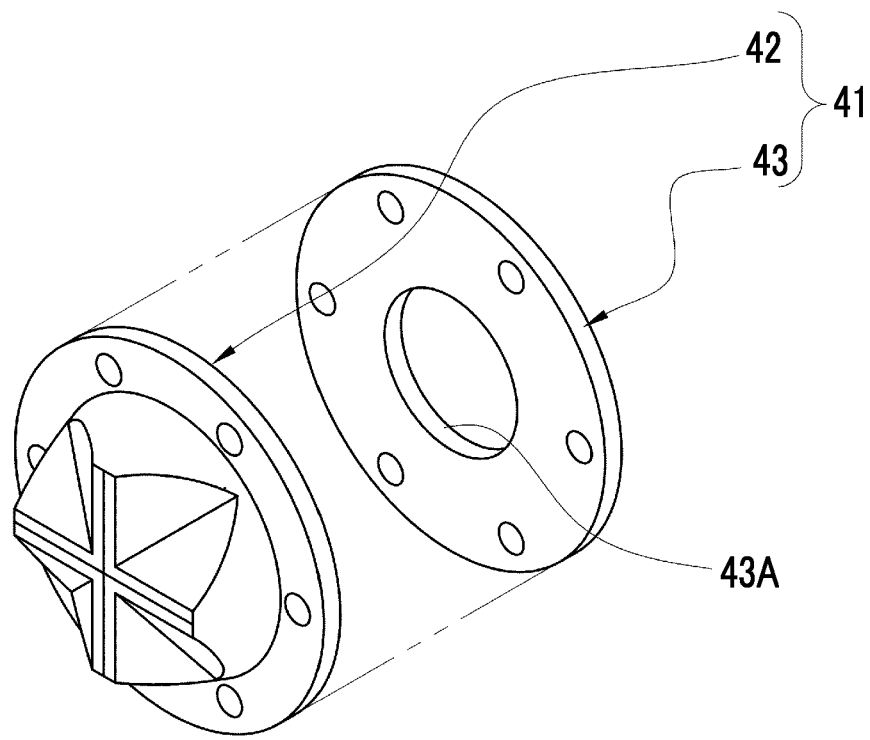
Figure 15:
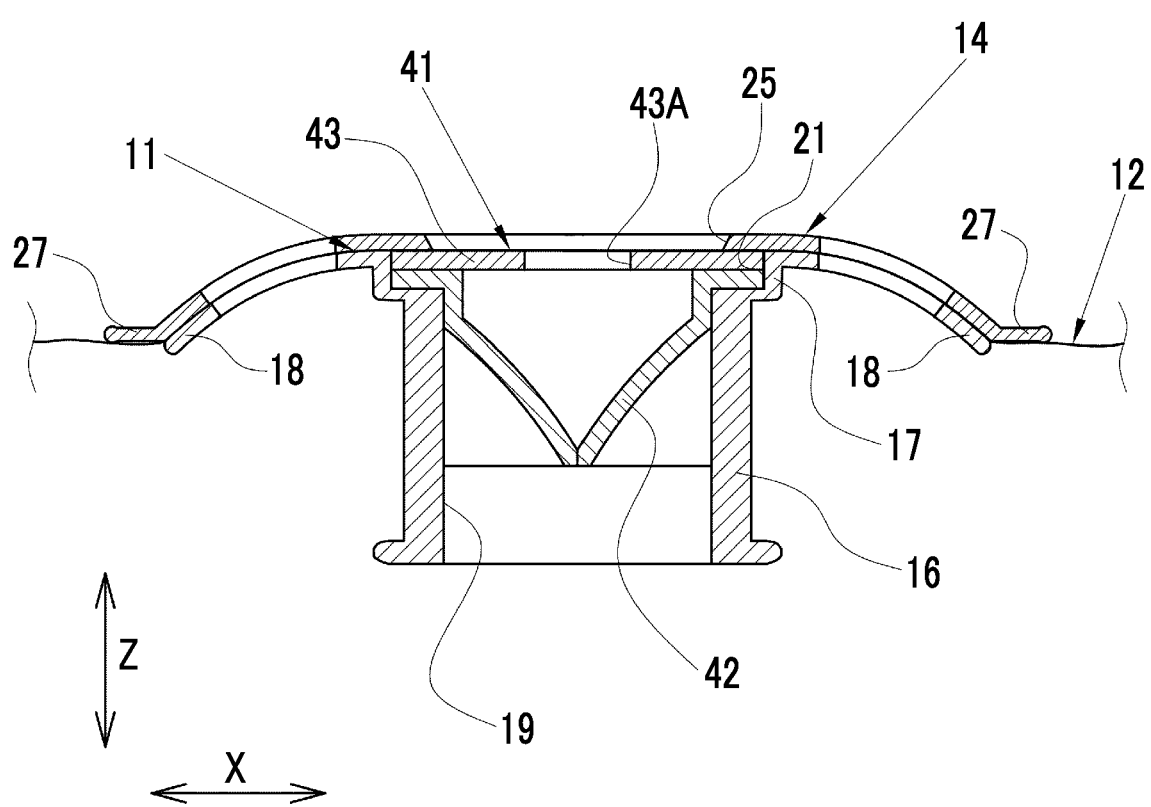
FIG. 15 is a cross-sectional view of major parts of an endoscope mouthpiece according to the second embodiment.

In the above first embodiment, as the fluid suppression member 13 that suppresses the passage of the fluid in the pipe line 19, an example has been shown in which the first slit 23A and the second slit 24A intersect each other and the fluid suppression member 13 includes the first porous member 23 and the second porous member 24 attached to the opening portion 21. However, the present invention is not limited to this, and a configuration may be adopted in which the passage of the fluid can be suppressed even in a state in which the insertion part 3 is inserted and even in a state in which the insertion part 3 is not inserted. FIGS. 14A and 14B show the configuration of a fluid suppression member 41 having a duckbill valve 42 and a thin plate member 43. As shown in FIG. 15, the fluid suppression member 41 is attached to the opening portion 21 in a state in which the duckbill valve 42 and the thin plate member 43 are laminated. In addition, the configuration is the same as that of the endoscope mouthpiece 10 of the above first embodiment except that the fluid suppression member 13 is replaced with the fluid suppression member 41, and the same components and the like will be designated by the same reference numerals, and the description thereof will be omitted.

The duckbill valve 42 has a well-known configuration used for endoscope mouthpieces or the like and maintains the airtightness of the pipe line 19 in a state in which the insertion part 3 is not inserted. Meanwhile, the thin plate member 43 has a through-hole 43A having an inner diameter that matches an outer diameter of the insertion part 3. In the thin plate member 43, an inner peripheral surface of the through-hole 43A is in close contact with the outer peripheral surface of the insertion part 3 in a state in which the insertion part 3 is inserted. That is, the passage of the fluid in the pipe line 19 is suppressed. By virtue of the above configuration, even in a case where the insertion part 3 is inserted through the fluid suppression member 41, or even in a case where the insertion part 3 is not inserted, the passage of the fluid can be suppressed, and the droplets are prevented from leaking from the fluid suppression member 41. Additionally, similar to the above first embodiment, the endoscope mouthpiece can be removed from the mouth of the patient 1 and then be wrapped in the drape 11 and discarded. Therefore, the adhering droplets of the patient 1 can be discarded without being diffused.

Third Embodiment

Figure 16:
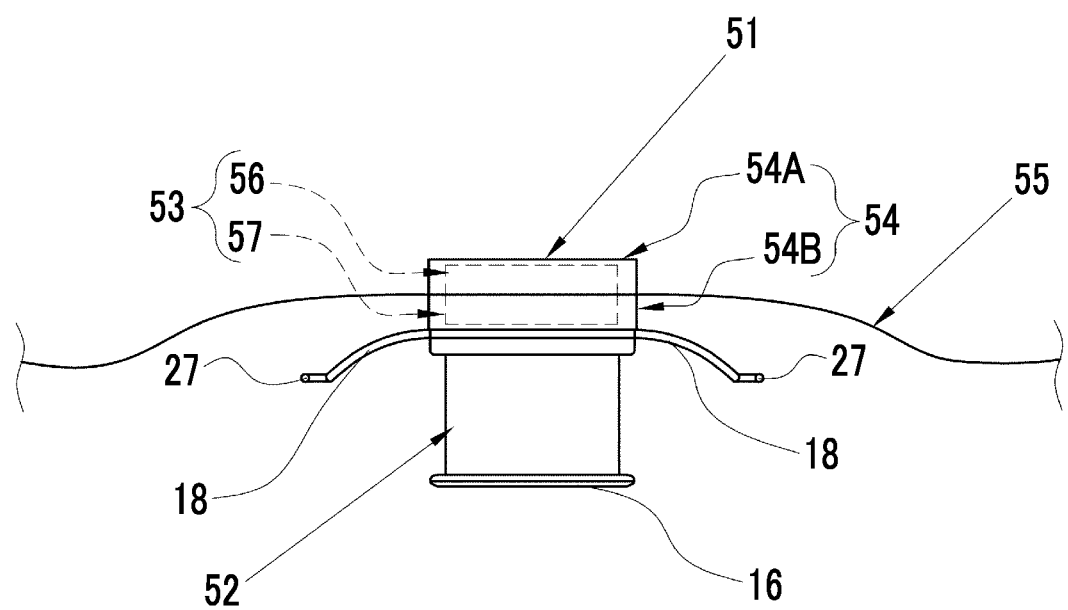
FIG. 16 is an explanatory view illustrating a drape adapter according to a third embodiment.

In the above first and second embodiments, in a case where the mouthpiece body 11 and the drape 12 are integrally provided and worn on the mouth of a patient, the drape 12 is configured to prevent the diffusion of the droplets. However, the present invention is not limited to this, and a configuration may be adopted in which a drape adapter separate from the endoscope mouthpiece is provided and the drape adapter is anchored to the endoscope mouthpiece. As shown in FIG. 16, a drape adapter 51 is used by being anchored to an endoscope mouthpiece 52. In addition, in this case, it is preferable to provide the band attachment part 27 similar to the above first embodiment on the endoscope mouthpiece 52. The configuration of the endoscope mouthpiece 52 is the same as that of the mouthpiece body 11 of the above first and second embodiments except that the band attachment part 27 is provided integrally with the pair of blade portions 18. The configurations of the respective parts will be designated by the same reference numerals, and the description thereof will be omitted.

Figure 17:
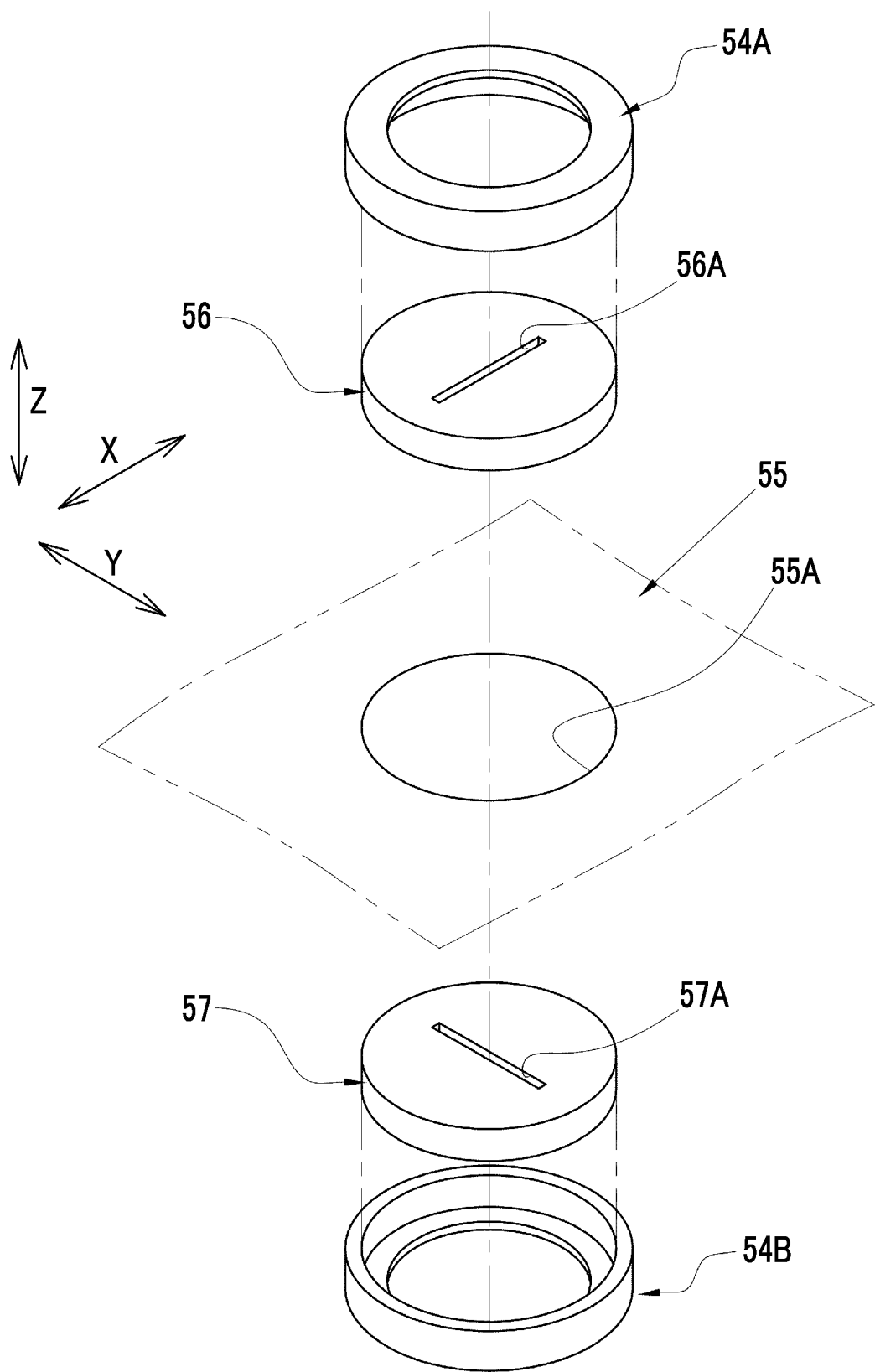
FIG. 17 is an exploded perspective view showing a configuration of the drape adapter.

The drape adapter 51 includes a fluid suppression member 53, a frame member 54, and a drape 55. The fluid suppression member 53 has a first porous member 56 and a second porous member 57. As shown in FIG. 17, the first porous member 56 is formed in a disk shape and has a first slit 56A. The first slit 56A is formed parallel to the left-right direction X and parallel to the insertion direction Z.

The second porous member 57 is formed in a disk shape and has a second slit 57A. The second slit 57A is formed in a direction parallel to the insertion direction Z and intersecting the first slit 56A. More specifically, the second slit 57A is formed parallel to the insertion direction Z and parallel to the front-back direction Y.

The frame member 54 includes a first frame member 54A and a second frame member 54B. The first frame member 54A and the second frame member 54B are fitted to outer peripheral surfaces of the first porous member 56 and the second porous member 57 and sandwich the first porous member 56 and the second porous member 57 in the insertion direction Z.

Similarly to the drapes 12 of the above first and second embodiments, the drape 55 has a small thickness and is formed in the shape of a quadrangular sheet, for example, is formed of a transparent vinyl sheet. The drape 55 is formed with an opening portion 55A that matches the outer shape of the fluid suppression member 53. Accordingly, since the drape 55 does not block the fluid suppression member 53, the insertion part 3 can be inserted into the pipe line 19 through the fluid suppression member 53. In addition, for convenience of illustration, the drapes 55 in FIGS. 17 and 18 are shown by cutting out only the periphery of the opening portion 55A (a range surrounded by a two-dot chain line), and the actual size thereof is larger than the range surrounded by the two-dot chain line.

Figure 18:
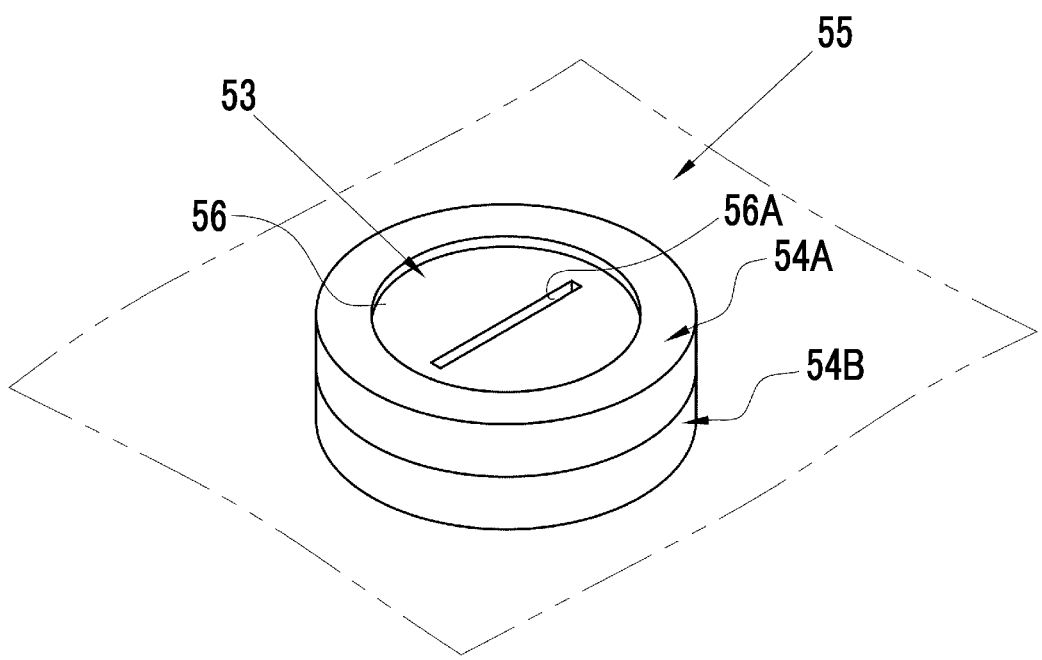
FIG. 18 is a perspective view of the drape adapter.

The first frame member 54A and the second frame member 54B sandwich the drape 55 in a state of being fitted to the outer peripheral surfaces of the first porous member 56 and the second porous member 57 (a state shown in FIG. 18). Accordingly, the first porous member 56 and the second porous member 57 are integrally provided in a laminated state, and the drape 55 is also integrally provided. In this case, for example, the first frame member 54A and the second frame member 54B are anchored to each other by adhesion or pressure-bonding. In addition, although not limited to this, a fitting pin may be formed in one of the first frame member 54A and the second frame member 54B, and a fitting hole may be formed in the other, and the frame members may be anchored by fitting the fitting pin and the fitting hole to each other.

In addition, the first porous member 56 and the second porous member 57 constituting the fluid suppression member 53 are attached to the frame member 54 in the laminated state. However, the present invention is not limited to this, and the first porous member 56 and the second porous member 57 may be integrally formed as the fluid suppression member 53, and the integrally formed fluid suppression member 53 may be attached to the frame member 54. Alternatively, the drape 55 may be directly anchored to an outer peripheral surface of the integrally formed fluid suppression member 53 without providing the frame member 54.

The drape adapter 51 is anchored to the endoscope mouthpiece 52 via, for example, double-sided tape. In this case, it is preferable to anchor the frame member 54 to the endoscope mouthpiece 52. In a case where the tubular portion 16 is held by the mouth M, the fluid suppression member 53 is disposed at an end of the pipe line 19 on the side located outside the body of the patient 1. In a case where the tubular portion 16 is held by the mouth M, the drape 55 is located on the side facing the outside of the body of the patient 1 with respect to the pair of blade portions 18.

After the endoscope mouthpiece 52 is worn on the mouth M of the patient 1, the doctor anchors the drape adapter 51 to the endoscope mouthpiece 52. By anchoring the drape adapter 51 to the endoscope mouthpiece 52 and bringing the drape 55 into a spread state, the head H of the patient 1 can be covered and hidden with the drape 55.

As described above, after the endoscope mouthpiece 52 is worn on the mouth M and the head H of the patient 1 is covered and hidden with the drape 55, the doctor inserts the insertion part 3 of the endoscope 2 through the pipe line 19 of the endoscope mouthpiece into the body of the patient 1 through the mouth M. Even in a case where the patient 1 coughs or sneezes in a case where the insertion part 3 is inserted through the mouth M, the drape 55 covers and hides the head H of the patient 1. Therefore, diffusion of the droplets discharged from the mouth M of the patient 1 can be prevented by the drape 55. Additionally, similar to the above first embodiment, the fluid suppression member 53 can suppress the passage of the fluid, and the droplets can be prevented from leaking from the fluid suppression member 13.

Additionally, the endoscope mouthpiece 52 is a disposable type in which the insertion part 3 is removed from the mouth of the patient 1, and is then removed from the mouth of the patient 1 together with the drape 55 and discarded. Accordingly, similar to the above first and second embodiments, since the endoscope mouthpiece 52 can be removed from the mouth of the patient 1 and then be wrapped in the drape 55 and discarded, the adhering droplets of the patient 1 are not diffused, and the endoscope mouthpiece 52 can be discarded.

In the above third embodiment, an example in which the fluid suppression member 53 constituting the drape adapter 51 includes the first porous member 56 and the second porous member 57 has been shown. However, the present invention is not limited to this, and a drape adapter may be configured from the fluid suppression member 41 having the same duckbill valve 42 and thin plate member 43 as those of the above second embodiment.

Figure 19:
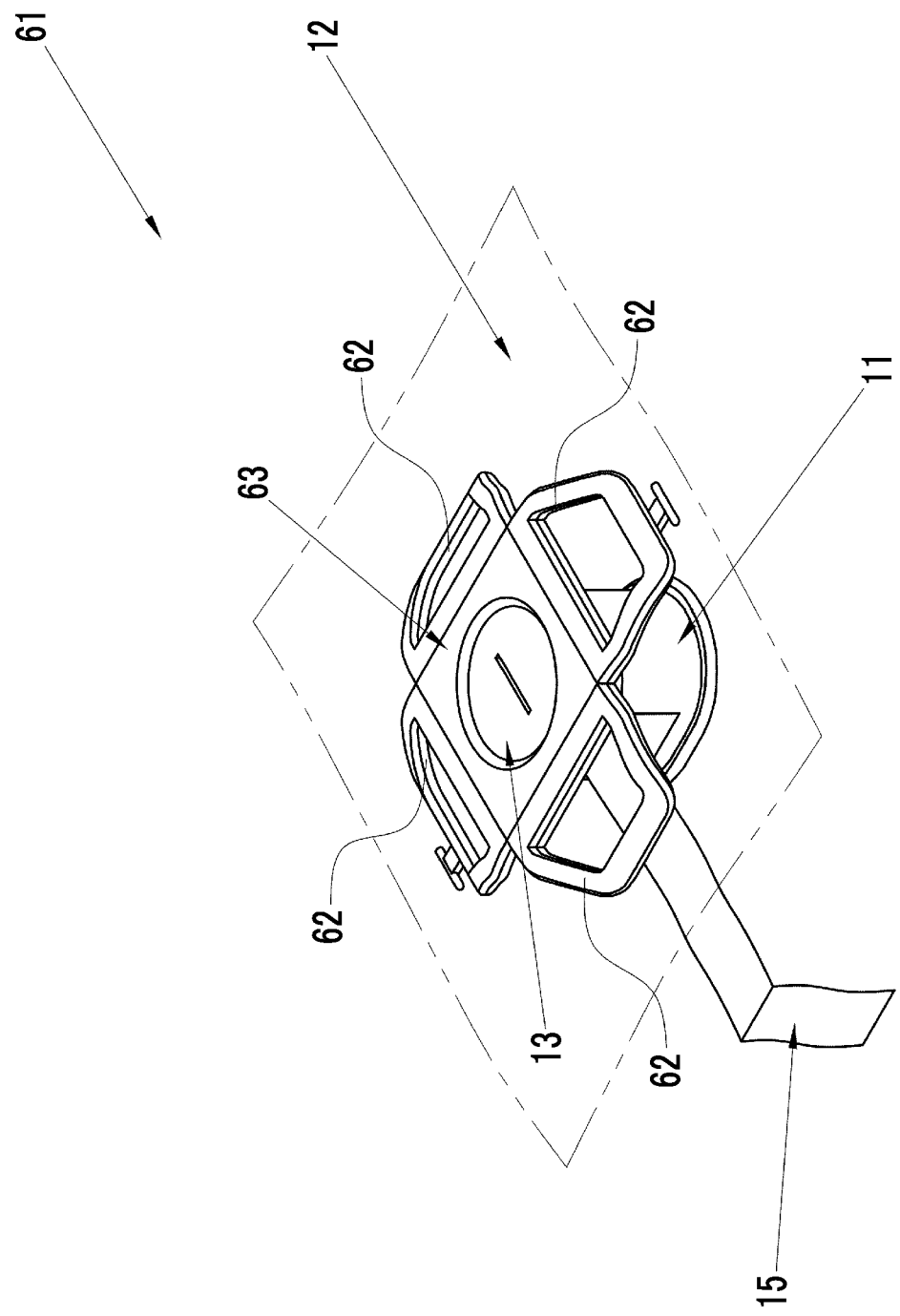
FIG. 19 is a first modification example of the endoscope mouthpiece.

In each of the above embodiments, an example in which the blade portions provided integrally with the mouthpiece body includes the pair of blade portions 18 that extends in the left-right direction X from both the left and right end parts of the frame portion 17 is given. However, the present invention is not limited to this, and the blade portions provided integrally with the mouthpiece body may be configured to extend radially around the pipe line 19. In a first modification example of an endoscope mouthpiece 61 shown in FIG. 19, a configuration is adopted in which four blade portions 62 are provided integrally with the mouthpiece body 11 and the four blade portions 62 extend radially around the pipe line 19. Additionally, in this case, a retaining member 63 also has a shape that matches the four blade portions 62. In addition, the number of blade portions 62 is not limited to 4, and may be a plurality of blade portions that extend radially around the pipe line 19.

Figure 20:
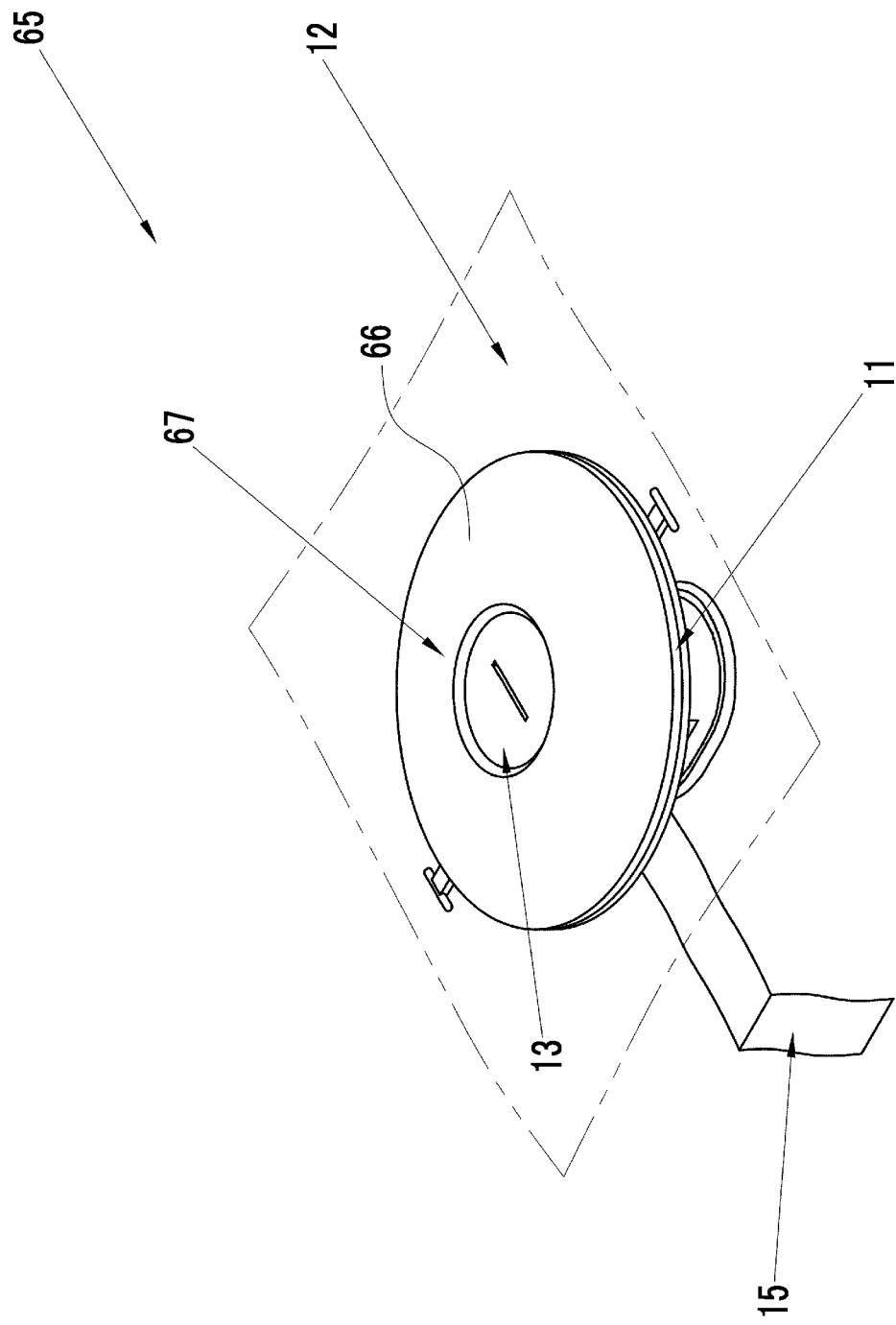
FIG. 20 is a second modification example of the endoscope mouthpiece.

Additionally, as another modification example in which the blade portions extend radially, as in the case of an endoscope mouthpiece 65 of a second modification example shown in FIG. 20, a configuration may be adopted in which circular blade portions 66 are provided integrally with the mouthpiece body 11 and the blade portions 66 are disposed around the pipe line 19. Additionally, in this case, a retaining member 67 also has a circular shape that matches the blade portions 66.

In each of the above embodiments, the first porous member 23 or 56 and the second porous member 24 or 57 constituting the fluid suppression member 13 or 53 are each formed with one slit. However, the present invention is not limited to this, and, for example, each porous member may be provided with three or more slits. In a modification example shown in FIGS. 21 and 22, a fluid suppression member 70 includes a first porous member 71 and a second porous member 72, and three slits are disposed in a Y shape.

Figure 21:
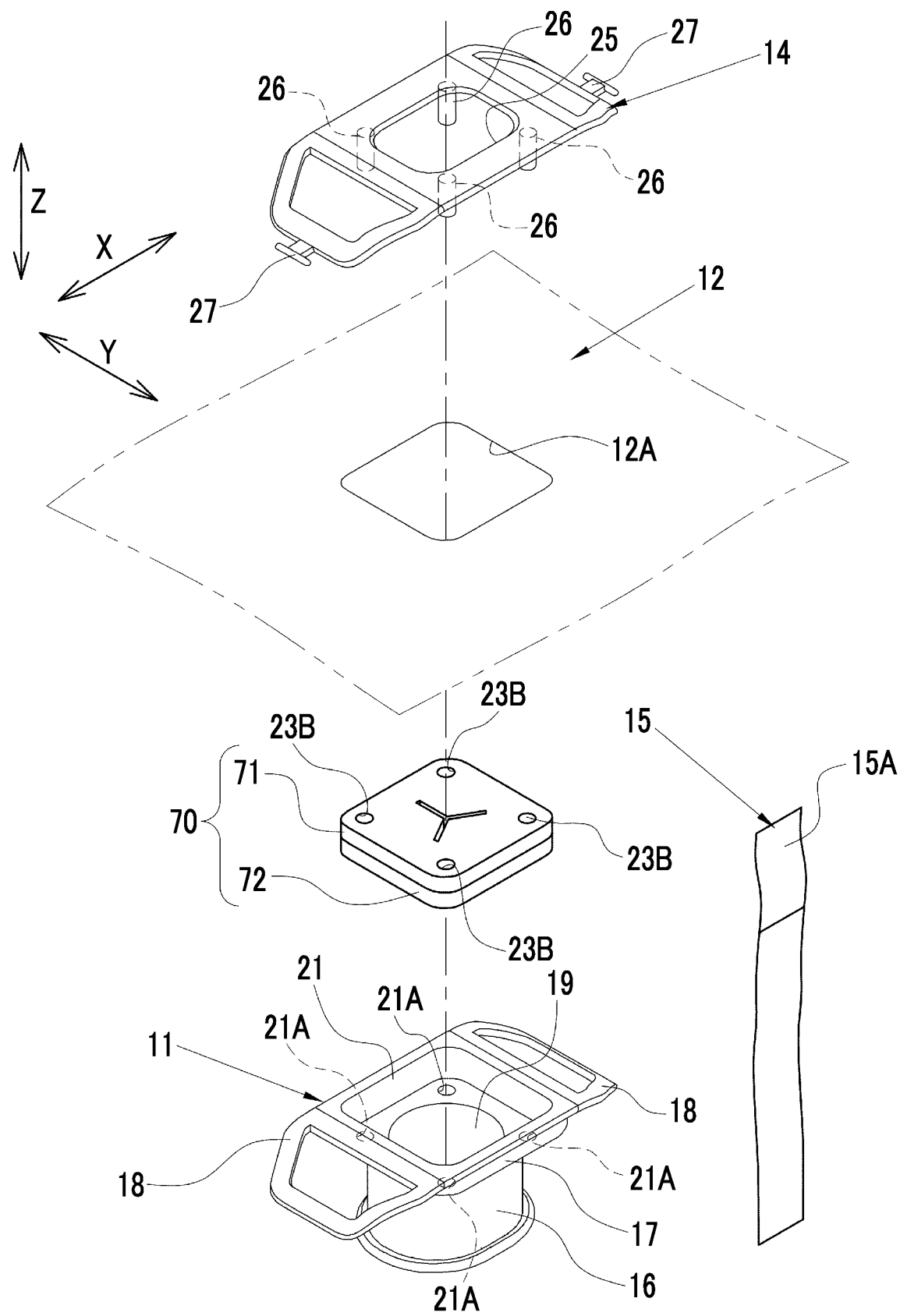
FIG. 21 is a third modification example of the endoscope mouthpiece.

As shown in FIG. 21, the fluid suppression member 70 is provided in the opening portion 21 of the mouthpiece body 11 similarly to the fluid suppression member 13 of the above first embodiment. The fluid suppression member 70 has a first porous member 71 and a second porous member 72. In addition, the same components and the like as those of the endoscope mouthpiece 10 of the above first embodiment will be designated by the same reference numerals, and the description thereof will be omitted.

Figure 22:
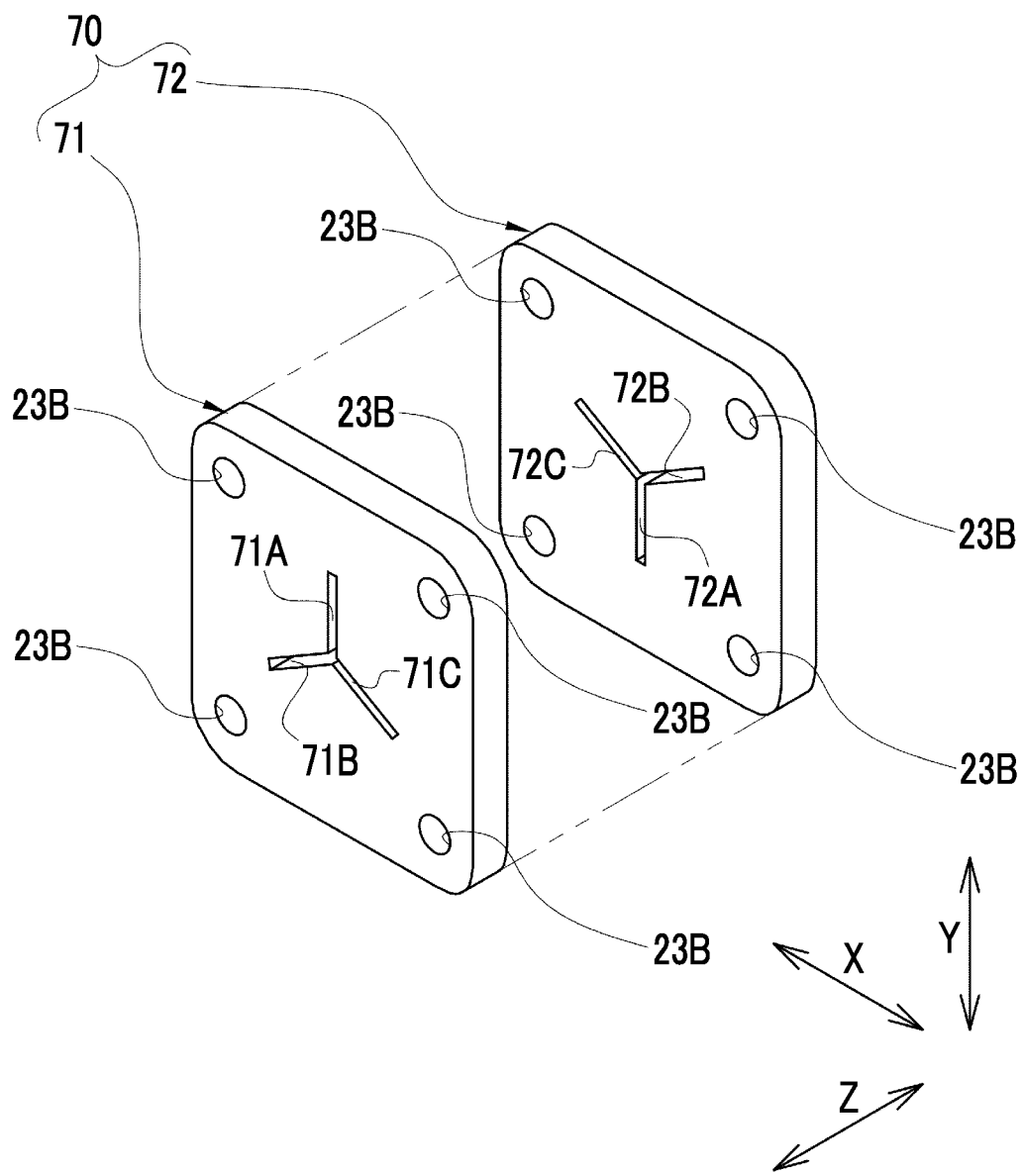
FIG. 22 is a configuration of a fluid suppression member constituting the third modification example

As shown in FIG. 22, the first porous member 71 is formed by forming a flexible porous material into a rectangular plate shape. The first porous member 71 has three first slits 71A to 71C. The first slits 71A to 71C are disposed in a Y shape. More specifically, the first slits 71A to 71C are disposed at equal angle intervals of 120° and are connected to each other at the center of the first porous member 71. One first slit 71A of the first slits 71A to 71C is perpendicular to one side of the first porous member 71, that is, perpendicular to the left-right direction X, and is disposed parallel to the front-back direction Y.

The second porous member 72 is formed by forming a flexible porous material into a rectangular plate shape. The second porous member 72 has three second slits 72A to 72C. Specifically, the disposition of the second porous member 72 is the same as the first porous member 71 rotated by 180° around a central axis parallel to the insertion direction Z, and similar to the first slits 71A to 71C, the second slits 72A to 72C are disposed at equal angle intervals of 120° and are connected to each other at the center of the second porous member 72. Accordingly, the second slits 72A to 72C are disposed at positions rotated by 180° around the central axis parallel to the insertion direction Z with respect to the first slits 71A to 71C. One second slit 72A of the second slits 72A to 72C is perpendicular to one side of the second porous member 72, that is, perpendicular to the left-right direction X, and is disposed parallel to the front-back direction Y. Cost reduction can be achieved by using two of the same porous members. Additionally, the porous material forming the first porous member 71 and the second porous member 72 is the same as that forming the porous member in each of the above embodiments.

As shown in FIG. 21, in the fluid suppression member 70, the first porous member 71 and the second porous member 72 are housed in the opening portion 21, and the positions thereof in the insertion direction Z are restricted by the retaining member 14. Accordingly, the first porous member 71 and the second porous member 72 are attached to the opening portion 21 in a laminated state. In addition, although not limited to this, as the fluid suppression member 70, the first porous member 71 and the second porous member 72 may be integrally formed, and the integrally formed fluid suppression member 70 may be attached to the opening portion 21 of the mouthpiece body 11. Additionally, the fluid suppression member 70 may be fixed to the mouthpiece body 11 or the like by adhesion without using the retaining member 14.

By providing the above-described fluid suppression member 70 in the mouthpiece body 11, in a case where the insertion part 3 is inserted into the pipe line 19 through the fluid suppression member 70, the insertion part 3 moves in the insertion direction Z while the outer peripheral surface of the insertion part 3 is in close contact with the first slits 71A to 71C and the second slits 72A to 72C. In this case, by providing the three first slits 71A to 71C and the three second slits 72A to 72C in the first porous member 71 and the second porous member 72, respectively, it is possible to insert the insertion part 3 with a resistance smaller than that of the fluid suppression member 13 of the above embodiment in which the slits 23A and 24A are provided one by one. Moreover, it is possible for insertion parts 3 having a small diameter of about 3 mm up to a large diameter of about 16 mm to be inserted with little resistance without any gaps. Accordingly, it is possible to form the first porous member 71 and the second porous member 72 from a porous material having a high density (having few voids), and the passage of the droplets can be further suppressed.

Additionally, since the fluid suppression member 13 of the above embodiment in which the slits 23A and 24A are provided one by one deviates from the position of the slit 24A of the second porous member 24 in a case where the center of the first porous member 23 is not aimed at in a case where the insertion part 3 is inserted, the insertion resistance increases. However, in the case of the fluid suppression member 70, the three first slits 71A to 71C and the second slits 72A to 72C are guided to the center of the first porous member 71 and of the second porous member 72. Therefore, it is not necessary to aim at the center in a case where the insertion part 3 is inserted.

In the fluid suppression member 70 of the modification example shown in FIGS. 21 and 22, three slits are provided in each of the first porous member 71 and the second porous member 72. However, the present invention is not limited to this, and four or more slits may be provided. In addition, even in a case where four or more slits are provided, it is preferable that these slits are disposed at equal angle intervals and are connected to each other at the centers of the first porous member 71 and the second porous member 72.

Additionally, in the modification examples shown in FIGS. 21 and 22, an example in which the fluid suppression member 70 is provided on the mouthpiece body 11 is given. However, the present invention is not limited to this, and the fluid suppression member 70 may be used for the drape adapter 51 in the above third embodiment. In addition, in this case, the configuration is the same as that of the drape adapter 51 of the above third embodiment except that the fluid suppression member 53 is replaced with the fluid suppression member 70.

In each of the above embodiments, the pressure-sensitive adhesive tape 15 is exemplified as the holding member for holding the drapes 12 and 55 in a folded state. However, the present invention is not limited to this, and the holding member may include any one of a locking member, a constraint member, and a coating member. It is preferable that the locking member as the holding member has a configuration in which at least a part of each of the drapes 12 and 55 is locked, for example, by a locking structure consisting of a locking claw and a locking hole, a button and a button hole used for clothes, a fitting structure in which a male button and a female button are fitted to each other, or the like. Additionally, the constraint member as the holding member is preferably a paper tape, a rubber band, or the like that constrains the periphery of each of the drapes 12 and 55 in the folded state. Additionally, it is preferable that the coating member as the holding member is a bag-shaped member that covers the entire drapes 12 and 55 in the folded state.

Additionally, in each of the above embodiments, examples in which the drapes 12 and 55 are formed from vinyl sheets are given. However, the present invention is not limited to this, and any sheet-like member that covers and hides at least a part of the subject may be adopted. For example, the drapes 12 and 55 may be formed from paper, cloth, or the like. Additionally, in each of the above embodiments, a bronchoscope is used as an example of the endoscope. However, the present invention is not limited to this, and any oral type endoscope may be used, and, for example, an upper gastrointestinal endoscope may be adopted.

EXPLANATION OF REFERENCES

1: patient
2: endoscope
3: insertion part
4: operating part
5: universal cord
10: endoscope mouthpiece
11: mouthpiece body
12: drape
12A: opening portion
13: fluid suppression member
14: retaining member
15: pressure-sensitive adhesive tape
15A: end part
16: tubular portion
17: frame portion
18: blade portion
19: pipe line
21: opening portion
21A: fitting hole
23: first porous member
23A: first slit
23B: fitting hole
23G: gap
24: second porous member
24A: second slit
24G: gap
25: opening portion
26: fitting pin
27: band attachment part
31: fixing band
31A: mounting hole
41: fluid suppression member
42: duckbill valve
43: thin plate member
43A: through-hole
51: drape adapter
52: endoscope mouthpiece
53: fluid suppression member
54: frame member
54A: first frame member
54B: second frame member
55: drape
55A: opening portion
56: first porous member
56A: first slit
57: second porous member
57A: second slit
61: endoscope mouthpiece
62: blade portion
63: retaining member
65: endoscope mouthpiece
66: blade portion
67: retaining member
70: fluid suppression member
71: first porous member
71A: first slit
71B: first slit
71C: first slit
72: second porous member
72A: second slit
72B: second slit
72C: second slit
H: head
M: mouth
X: left-right direction
Y: front-back direction
Z: insertion direction

What is claimed is:

1. An endoscope mouthpiece comprising:
a mouthpiece body configured to be held by a mouth of a subject when an insertion part of an endoscope is orally inserted into the subject, the mouthpiece body including:
a pipe line configured to receive the insertion part therethrough; and
an opening portion provided at an end of the pipe line on a side located outside a body of the subject when the mouthpiece body is held within the mouth of the subject,
a drape that protrudes from an outer peripheral edge of the mouthpiece body and that is provided integrally with the mouthpiece body to cover at least a part of the subject; and
a fluid suppression member that is provided in the opening portion to suppress passage of a fluid in the pipe line.

2. The endoscope mouthpiece according to claim 1, further comprising:
a blade portion that is provided integrally with the mouthpiece body,
wherein the drape is located on a side facing the outside of the body with respect to the blade portion.

3. The endoscope mouthpiece according to claim 2,
wherein the blade portion is one or a plurality of blade portions that extend in a direction intersecting the insertion direction of the insertion part.

4. The endoscope mouthpiece according to claim 2,
wherein the blade portion is one or a plurality of blade portions that extend radially around the pipe line.

5. The endoscope mouthpiece according to claim 2,
wherein the blade portion is configured to serve as a handle when the mouthpiece body is held within the mouth of the subject.

6. The endoscope mouthpiece according to claim 2,
wherein the mouthpiece body is integrally provided with a band attachment part configured to attach an end part of a fixing band that can be wound around a head of the subject.

7. The endoscope mouthpiece according to claim 1,
wherein the fluid suppression member includes:

a first porous member having a first slit formed therein, the first slit being parallel to an insertion direction of the insertion part; and a second porous member having a second slit formed therein, the second slit being parallel to the insertion direction of the insertion part and intersecting the first slit, and the fluid suppression member is attached to the opening portion.

8. The endoscope mouthpiece according to claim 7, wherein the fluid suppression member is attached to the opening portion in a state in which the first porous member and the second porous member are laminated.

9. The endoscope mouthpiece according to claim 1, wherein the fluid suppression member includes:

a first porous member having at least three first slits formed therein; and a second porous member having at least three second slits formed therein, and the fluid suppression member is attached to the opening portion.

10. The endoscope mouthpiece according to claim 9, wherein three first slits are formed in the first porous member, and three second slits are formed in the second porous member.

11. The endoscope mouthpiece according to claim 10, wherein the first porous member and the second porous member have a rectangular outer shape, one of the first slits is disposed to be perpendicular to one side of the first porous member, one of the second slits is disposed to be perpendicular to one side of the second porous member, and the first porous member and the second porous member are attached to the opening portion in a state in which the second slit is disposed at a position rotated by 180° around a central axis parallel to the insertion direction with respect to the first slit.

12. The endoscope mouthpiece according to claim 1, wherein the fluid suppression member includes:

a duckbill valve that maintains airtightness of the pipe line in a state in which the insertion part is not inserted; and a thin plate member that has a through-hole with an inner diameter that matches an outer diameter of the insertion part and that maintains the airtightness of the pipe line in a state in which the insertion part is inserted, and the fluid suppression member is attached to the opening portion in a state in which the duckbill valve and the thin plate member are laminated.

13. The endoscope mouthpiece according to claim 1, wherein the drape is formed in a shape of a sheet and is configured to be in a folded state when not in use, and is configured such that a holding member may be stuck on the drape in the folded state to hold the drape in the folded state.

14. The endoscope mouthpiece according to claim 13, wherein the holding member is at least one of a pressure-sensitive adhesive tape, a locking member, a constraint member, or a coating member.

* * * * *